United States Patent [19]

Donabin

[11] 4,175,694
[45] Nov. 27, 1979

[54] METHOD AND APPARATUS FOR PROCESSING DOCUMENTS

[75] Inventor: Claude J. Donabin, Angers, France

[73] Assignee: Compagnie Internationale pour l'Informatique Cii-Honeywell Bull (Societe Anonyme), Paris, France

[21] Appl. No.: 870,569

[22] Filed: Jan. 18, 1978

[30] Foreign Application Priority Data

Feb. 3, 1977 [FR] France ............................. 77 02963

[51] Int. Cl.² .................. G06K 13/00; B25J 3/00; B65H 5/22; B65H 5/12
[52] U.S. Cl. .................................. 235/475; 235/476; 271/3; 271/266; 235/431
[58] Field of Search ............ 235/475, 419, 375, 379, 235/431; 271/3, 266; 214/1 M

[56] References Cited

U.S. PATENT DOCUMENTS 3,977,533  8/1976  Hills et al. .......................... 235/475
4,031,359  6/1977  Christou et al. .................... 235/475

Primary Examiner—Daryl W. Cook
Attorney, Agent, or Firm—Cameron, Kerkam, Sutton, Stowell & Stowell

[57] ABSTRACT

A method and apparatus for processing documents having both pre-printed information adapted to be identified by an automatic recognition device and handwritten information adapted to be identified by the human eye. Each document is subjected to an operation involving the reading of the information contained thereon in two recurrent operating phases and an operation involving the recording of fresh data thereon. In the first phase, the pre-printed information is read by an automatic recognition device. During the second phase, the handwritten information is read visually and transcribed by an encoding device. Simultaneously therewith, fresh data is recorded on another document which was subjected to a reading operation in the course of the two next preceding operating phases.

12 Claims, 10 Drawing Figures

Fig: 1

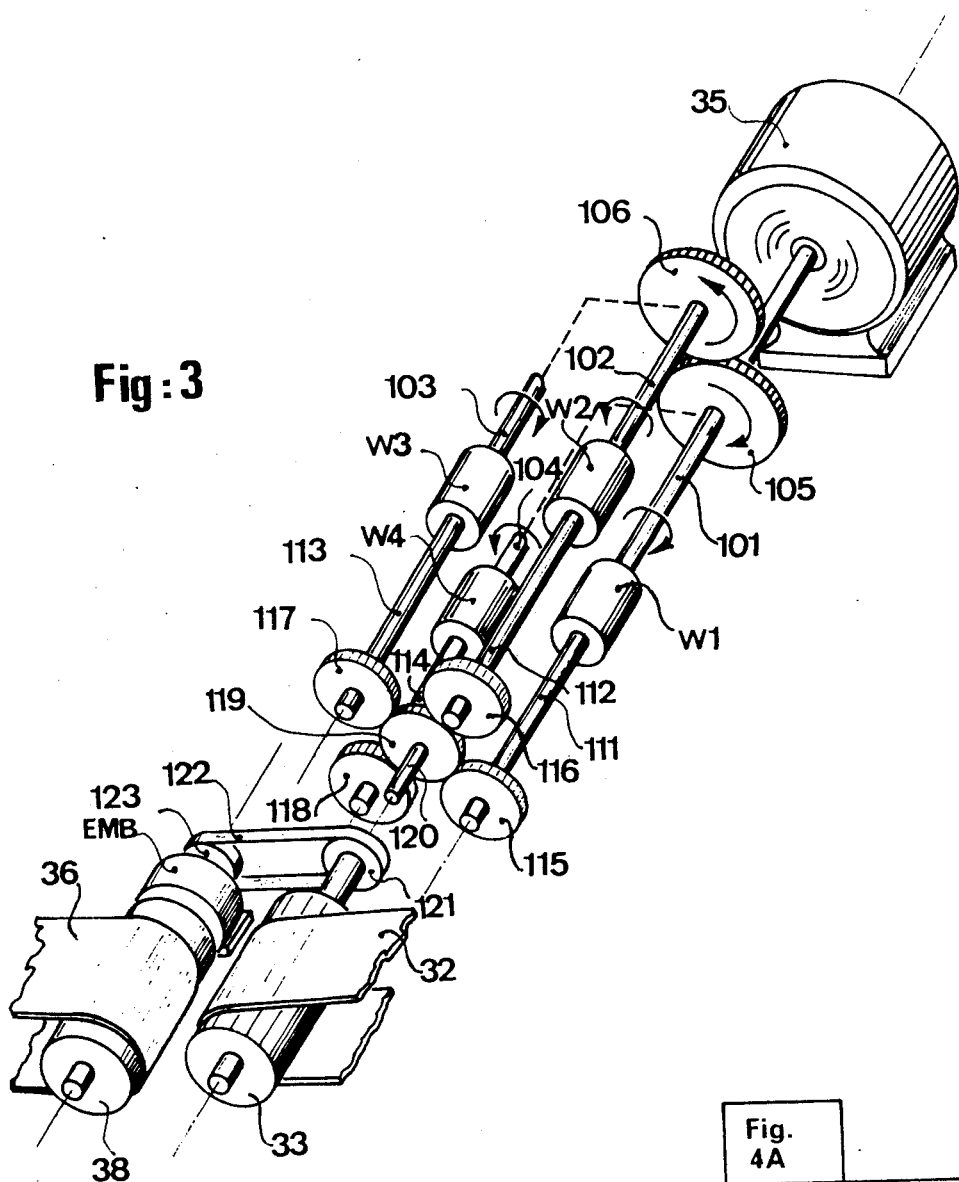

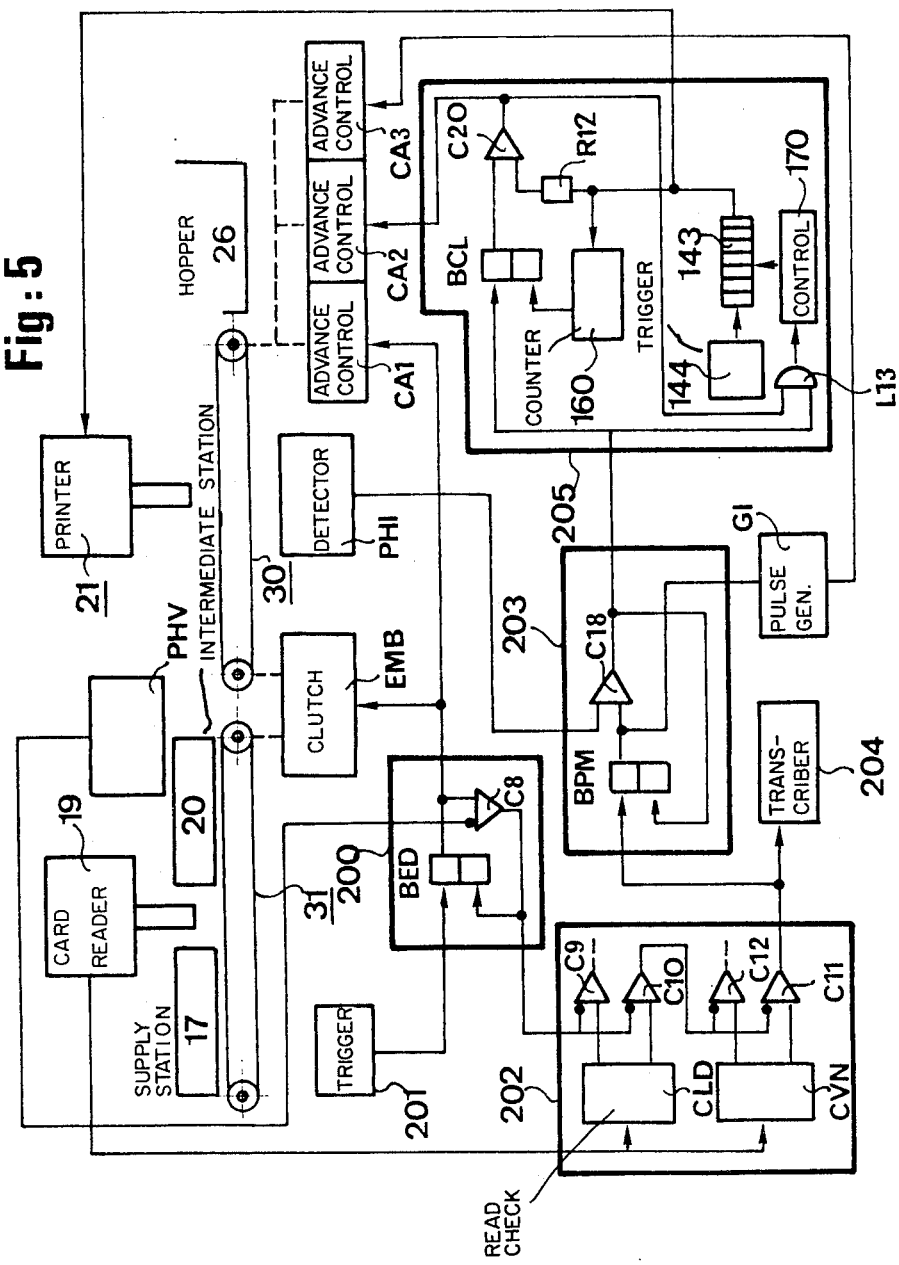

METHOD AND APPARATUS FOR PROCESSING DOCUMENTS

BACKGROUND OF THE INVENTION (a) Field of the Invention

The present invention relates to a method of processing documents, in which each document is subjected to a reading operation intended to identify information carried by the document and an operation involving recording fresh data on the document. It also relates to apparatus for processing documents by this method.

(b) Description of the Prior Art

Methods and apparatus are known for processing documents such as cards, checks, money orders, invoices, envelopes, or similar documents, in which the information carried by the documents may be analyzed automatically by optical, magnetic, or other methods, the information then taking the form of marks, perforations or printed characters which can be identified both by the human eye and by an automatic reader. Apparatus of this nature is widely used in businesses having a number of branches, such as agencies or banks, for example, each branch being equipped for this purpose with one or more of the pieces of apparatus and each piece of apparatus being connected to a central computer which is sometimes very distant from it.

In apparatus of this kind, such as that which is described in U.S. Pat. No. 3,207,505, for example, the documents to be processed, having first been placed in a supply magazine, are extracted from the magazine one by one and are fed along a track, which is generally formed by rotary drive rollers or conveyor belts, so that they pass successively under a reading device and a recording device and are finally channelled into a receiving hopper. As a document passes under the reading device, the information carried by the document is read and transmitted to a data-processing device such as a computer. When the reading operation has been completed, the document is fed under the recording device, which then records fresh data on the document.

However, such apparatus proves ill-adapted to processing documents, such as cheques for example, which carry both pre-printed information which can be identified by an automatic recognition device and hand-written information such as the date or the amount of a debit or credit which, since it cannot generally be identified by such an automatic recognition device, calls for a keyboard to be used to enable it to be fed into the processing device. Because on the one hand, the hand-written details on such a document cannot be fed in, by means of the keyboard, until the pre-printed information on the document, relating for example to the drawer's account number or to the Bank number, has been identified by the automatic recognition device, and because on the other hand the documents, when in the apparatus, are virtually never at rest between the moment when they are moved forward to pass under the reading device and the moment when they are discharged into the receiving hopper, it is in fact very difficult for the operator to see the hand-written information and consequently it is virtually impossible for it to be transcribed onto the keyboard. A way of enabling the operator to read the hand-written information carried by the documents would obviously be to stop the document momentarily at the time when it was leaving the reading device but this procedure has the disadvantage that the forward movement of the documents is interrupted each time something has to be transcribed onto the keyboard and thus considerably reduces the processing rate of the apparatus.

The present invention overcomes this disadvantage and provides both a method and an apparatus for putting this method into effect, which enables documents carrying both information which can be read by the human eye and information which can be identified by an automatic recognition device to be processed at a relatively fast rate, each document having fresh data recorded on it after the information which it carries has been read and processed.

SUMMARY OF THE INVENTION

One aspect of the invention relates to a method of processing documents which carry information of a first kind which can be identified only by the human eye, and information of a second kind which can be identified by an automatic recognition device in which method each document is subjected to an operation involving the reading of the information which it carries and to an operation involving the recording of fresh data on the document, this method being characterised in that it comprises two recurrent operating phases, the first of these two phases consisting in having an automatic recognition device read the information of the second kind recorded on the document, and the second of the said phases consisting in having the information of the first kind carried by the document read visually and transcribed by means of an encoding device, and in addition in simultaneously having fresh data recorded on another document which was subjected to a reading operation in the course of the two preceding operating phases.

Another aspect of the invention relates to an apparatus for putting into effect the method described above, in which documents, having been introduced one by one into a supply station, are fed to a receiving station, via, successively, an automatic recognition device, an automatic recognition device, an intermediate stopped position, and a data recording device this apparatus including a document feeding arrangement which consist of a first conveyor arranged between the recording device and the receiving station, a second conveyor arranged between the supply station and the intermediate stopped position, control means to cause the first conveyor to advance either continuously or step by step, mechanical coupling means which, when energised, enable the second conveyor to be connected mechanically to the first conveyor, and intercommunication means which are designed to energise the said control means and the said coupling means so that, in the course of a first phase, a document situated under the recording device will be ejected to the receiving station, whilst a second document in the stopped position will be brought under the recording device and a third document will be fed from the supply station to the intermediate stopped position, and, in the course of a second phase, the document which has been brought under the recording device will be positioned under this device which enables it to receive fresh data.

BRIEF DESCRIPTION OF THE DRAWINGS

Other features and advantages of the invention will be more clearly apparent from a perusal of the following description, which is given by way of non-limiting example, and from reference to the accompanying drawings, in which:

FIG. 3 is a schematic perspective view showing an embodiment of the document-feeding mechanism of the apparatus of FIG. 1.

FIG. 4 shows how FIGS. 4A to 4E should be combined.

FIG. 5 is a simplified logic diagram which shows the chief parts of the combined diagram formed by FIGS. 4A to 4E, in the form of blocks.

DESCRIPTION OF THE PREFERRED EMBODIMENTS

Figure 1:
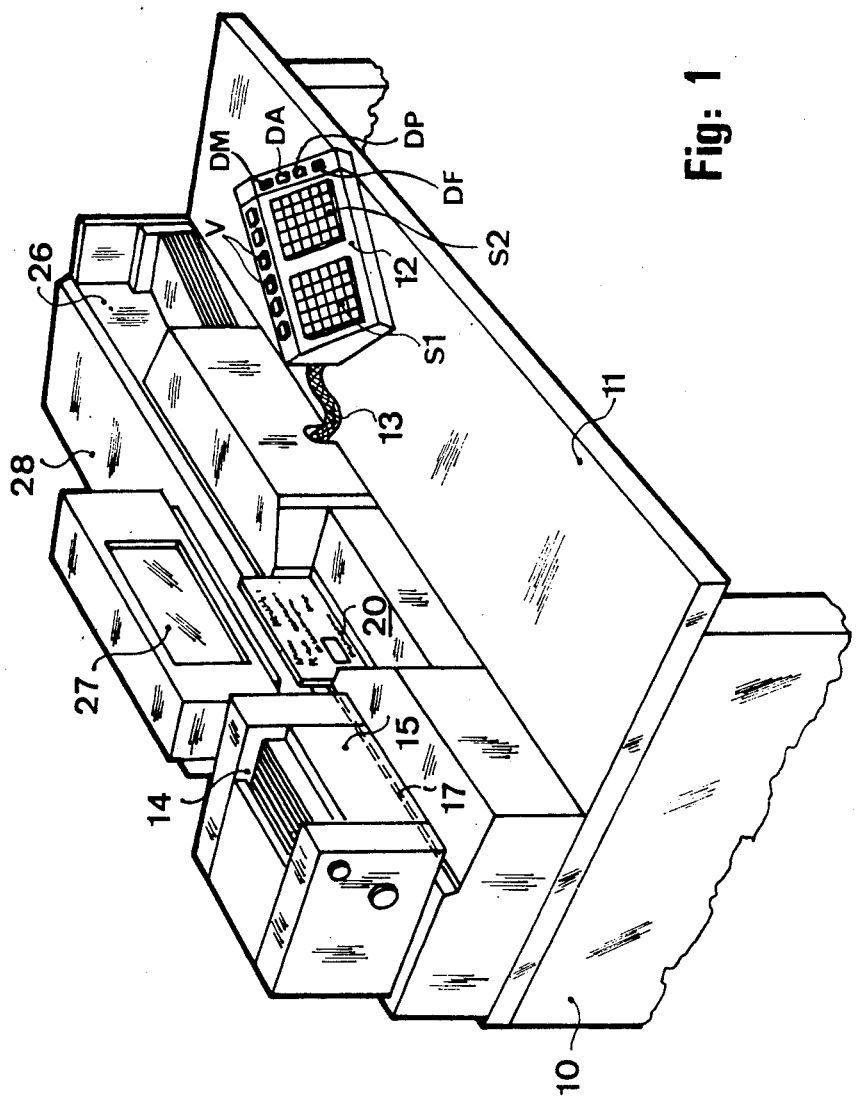
FIG. 1 is a general view of the operation station of an apparatus arranged in accordance with the invention.

In the document processing apparatus which is shown in FIG. 1, the mechanisms for handling the document are grouped together on the top of a desk 10 which forms a support for the mechanisms and which is provided with casings to protect the said mechanisms. A front portion 11 forms a desk-top on which is an electronic keyboard 12. This keyboard 12 is electrically connected to the circuits for controlling the apparatus by a multi-core electrical cable 13. This cable is sufficiently long to allow an operator working at the apparatus to position the keyboard anywhere he pleases on the desk-top 11. The apparatus is equipped with a supply magazine 14 in which the documents to be processed are placed.

In the example being described, it will be assumed that the documents are formed by checks, but it will be seen that the invention may equally well be applied to other documents, such as money orders, invoices, cards, or the like, which contain both information which can be identified by an automatic recognition device and information which can be identified only by the human eye. In the example being described in which the documents are formed by checks, the information which can be identified by automatic recognition device is formed by coded characters made up of vertical lines such as those which are described, for example, in British Pat. No. 910,328 or U.S. Pat. No. 3,044,696. It will be assumed that these coded characters are printed along the lower longitudinal ledge of each check and that they represent, in particular, the account number of the customer who has issued the check. It will similarly be assumed, in the example being described, that the information which can be identified only by the human eye is formed by the data which has been hand-written by the customer and represents, for example, the amount debited by the customer.

Figure 4A:
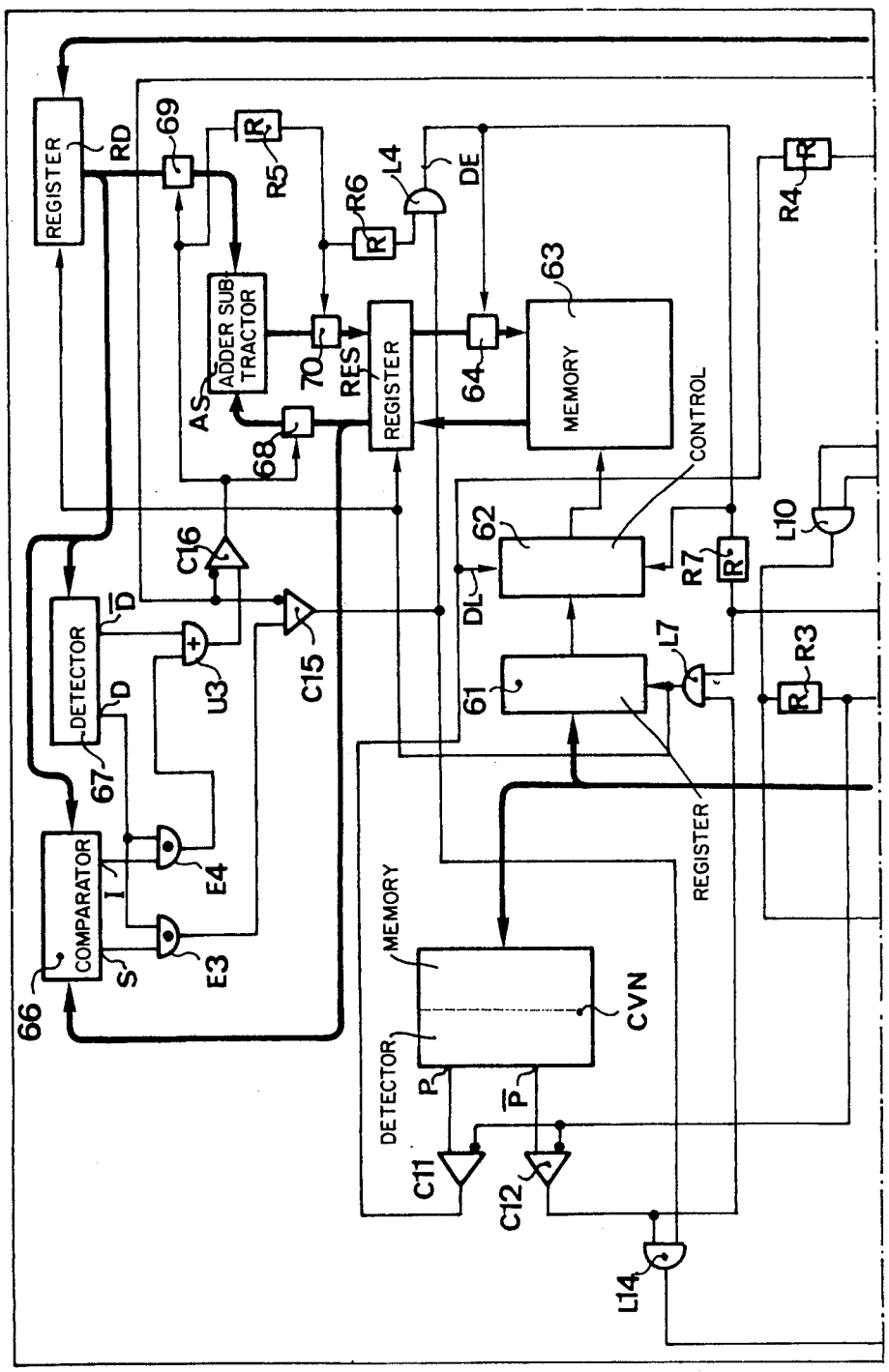
FIGS. 4A to 4E, when combined, form a detailed logic diagram for the circuits used to control the operation of the apparatus of FIG. 1.

The checks, which are placed on edge in the supply magazine 14, are extracted one by one from the magazine by means of an extraction device or check feeding device of a known kind which is accommodated in a housing 15 and is designed to extract the checks from the magazine 14 without damaging them. In the example being described, this extraction device, which is marked 16 in FIG. 4D, is similar to that described and shown in British Pat. No. 1,170,159 or U.S. Pat. No. 3,393,907 and consists of a continuously rotating roller coupled to an electromagnetic actuating mechanism which, whenever an electrical pulse is applied to the actuating mechanism, is temporarily brought into contact with the stack formed by the checks placed in the magazine so that one check is fed out of the magazine. It should however be mentioned that the extraction device which has just been described is not specific to the invention and, depending upon the type of documents present in the magazine 14, could be replaced by any other kind of extraction device employing belts, brushes, suckers, etc.

The checks which have been extracted one by one from the supply magazine 14 in this way are fed to a supply station 17 which is situated underneath the magazine 14 at the end of a track in the apparatus along which checks are fed to be processed in succession. If reference is made to FIG. 2, it can be seen that the checks are fed along the track by a transporter mechanism which will be described later and which enables a check 18, which has previously been brought to the supply station 17, to be propelled along so as to pass in front of a conventional reading device or card reader 19, and then to an intermediate stopped position 20 in which the said check is visible to the operator, as can be seen in FIG. 1. When the check is stationary at the position 20, the handwritten information carried by it can then be transcribed by the operator onto the keyboard 12. When this transcription has been completed, the check is again propelled along by the transporter mechanism so as to pass in front of a data recording device or print mechanism 21 (FIG. 2) where information, such as the date or a filing number, for example, are recorded on it.

In the example being described, the recording device 21 is formed by a printing device which consists on the one hand of a wheel 22 which carries printing characters in relief around its periphery, this wheel being driven continuously in rotation by electric motor 23, and on the other hand of a striker hammer 24 which is arranged close to the periphery of the wheel 22, this hammer being actuated at predetermined times by an actuating device 25 to apply the check, after it has first been brought to the printing position between the wheel 22 and the hammer 24, against selected printed characters. Inking is effected by an inked ribbon (not shown) interposed between the wheel 22 and the check when in the printing position. In the course of this printing operation, the check is moved forward step by step by the transporter mechanism, with the check moving up one step each time a character has been printed on it in order to enable the next character to be printed. It should, however, be mentioned that the recording device which has just been described does not limit the invention and could be replaced, to suit particular cases and applications, by any other kind of recording device such as, for example, a document perforator. Similarly, the printing device which, in the example being supplied, includes only a single character-bearing wheel associated with one striker hammer, could be replaced by a printing device which, like a printing device having a character-bearing drum, for example, enables a plurality of characters to be printed on the same check, without the need to move the check after each of the characters had been printed for this purpose.

When the recording of data on the check situated in front of the recording device 21 has been completed, the check is again propelled forward by the transporter mechanism and is ejected to a receiving station which, in the example being described, is formed by a receiving hopper 26 (FIGS. 1 and 2), this hopper being, for example, of the kind which is described and illustrated in French Patent application No. 76/12764 filed in France on Apr. 29, 1976.

The document processing apparatus which is shown in FIG. 1 also includes a display screen 27 which is positioned in the protective housing 28 of the apparatus and on which information which can be directly read by the operator appears if an incident occurs while the apparatus is operating, this information being intended to indicate to the operator the nature of the incident.

Figure 2:
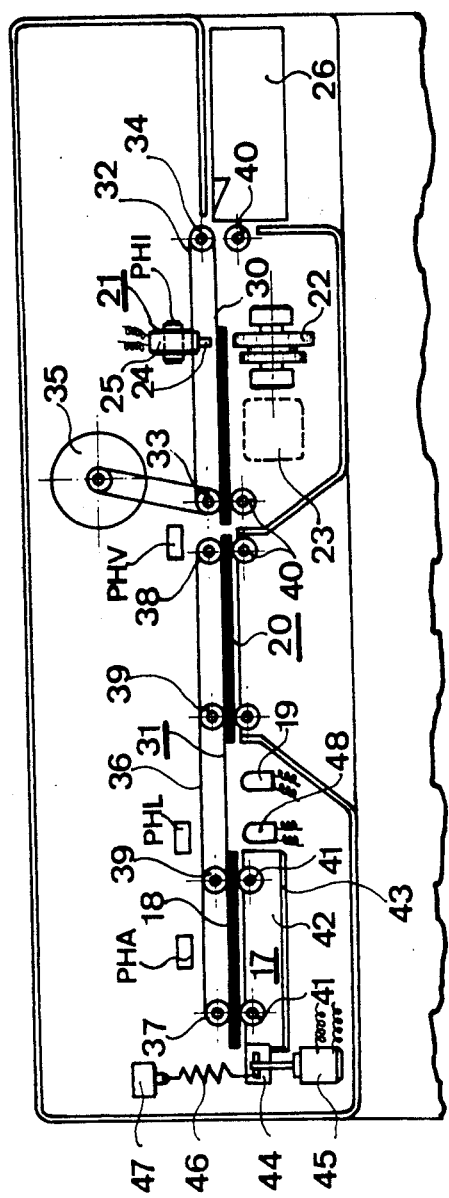
FIG. 2 is a schematic view intended to show the main arrangements of the apparatus shown in FIG. 1.

If reference is now made to FIG. 2, it can be seen that the transporter mechanism which enables a cheque at the supply station 17 to be propelled towards the receiving hopper 26 and in so doing to pass, in succession, the reading device 19, the intermediate stopped position 20 and the recording device 21, comprises a first conveyor 30 which extends, past the recording device 21, between the stopped position 20 and the receiving hopper 26, and a second conveyor 31 which extends between the supply station 17 and the stopped position 20. In the example being described, the first conveyor 30 is formed by an endless belt 32 which is tensioned between two rollers 33 and 34, roller 33 being mechanically coupled to a drive motor 35. Similarly, in the example being described, the second conveyor 31 is formed by an endless belt 36 which is tensioned between two rollers 37 and 38. The drive mechanism which enables the rollers 33 and 38, and the two belts 32 and 36 mounted on these rollers, to be driven from motor 35 will be described in detail below. In order to prevent slipping of the cheques which are propelled along by the belts, intermediate rollers 39 and pressure rollers 40 are provided, the pressure rollers being distributed in such a way that any cheque being propelled by the belts is at all times gripped between the belts and at least one of the pressure rollers. The two pressure rollers which are arranged at the supply station 17 may however be moved away from the belt 36 to enable a cheque extracted from the supply magazine 14 to be inserted in the station. For this purpose, the two pressure rollers are mounted on shafts 41 which are attached to a support block 42 which is pivoted on a hinge 43 secured to the framework of the apparatus. The support block 42 is provided with a lever 44 to whose end is hinged a rod actuated by a solenoid 45. When the solenoid 45 is energized, in a manner which will be indicated below, the rod pulls against the lever 44 and thus compels the support block 42 to pivot around the hinge 43, the effect of which is to move the two pressure rollers mounted on the shafts 41 away from the belt 36. Under these conditions, the check which is extracted from the magazine 14 can take its place between the two rollers and the belt 36 longitudinally to the latter. When the solenoid 45 then ceases to be energized, the two rollers return to their initial position, in order to press the check against the belt 36, under the action of a traction spring 46 which is arranged between the end of arm 44 and an attachment lug 47 secured to the framework of the apparatus.

There will now be described, with reference to FIG. 3, the drive mechanism which enables the rollers 33 and 38, and thus the belts 32 and 36, to be driven from motor 35. As can be seen in FIG. 3, this drive mechanism consists of a set of four main shafts 101, 102, 103 and 104, one of which, 101, is driven directly by motor 35 and the three others of which are driven by motor 35 through gears of which only two, 105 and 106, are shown in FIG. 3 for obvious reasons for clarity. The shafts 102, 103 and 104 and the associated gears are so arranged that shaft 103 turns in the same direction as shaft 101, while shafts 102 and 104 turn in the opposite direction from shaft 101. The drive mechanism also includes a set of secondary shafts 111, 112, 113 and 114 which are, respectively, driven by main shafts 101, 102, 103, 104 by means of clutches W1, W2, W3 and W4. These four secondary shafts mesh with the shaft 120 of roller 33 by means of gears 115, 116, 117, 118 and 119.

Clutches W1 and W2 are conventional electromagnetic clutches in which a continuously rotating drive shaft is provided with a cylindrical magnetic circuit, in the body of which is housed an energization coil which, when energized, attracts a friction disc which is secured in rotation to a shaft to be driven.

Clutches W3 and W4, on the other hand, are conventional single-revolution clutches such as described, for example, in British Pat. No. 636,911 or U.S. Pat. No. 2,610,736 and in which a continuously rotating drive shaft is provided with a ring containing a cut-out in which a pawl, which is secured to the shaft of the mechanism to be driven, is able to engage under the prompting of a spring. The pawl is normally held out of engagement with the cut-out in the said ring by means of a catch which is secured to the moving plate of a solenoid, this catch being held in engagement with the said pawl by a spring which holds the moving plate away from the fixed armature of the solenoid. When the solenoid is energized, the plate is attracted and the spring attached to it is tensioned and the pawl is freed. Under the prompting of its spring, the pawl is then able to engage in the cut-out in the ring on the driving shaft and drive the mechanism. When the solenoid ceases to be energized, the catch on the plate falls again and the pawl, as it rotates, is caught in passing by the catch, which disengages it from the cut-out in the ring and causes the mechanism to be declutched.

In the drive mechanism shown in FIG. 2, it can be seen that the four secondary shafts 111, 112, 113 and 114 are driven simultaneously as soon as one of the four clutches W1, W2, W3 and W4 is energized. To prevent the pawl of a single revolution clutch which is not energized from being driven in rotation by the corresponding secondary shaft because one of the other three clutches is energized, the single revolution clutch in question is coupled to the secondary shaft which it is intended to drive by means of an additional electromagnetic clutch of the same type as clutches W1 and W2. This additional clutch (not shown in the drawings) is energized only between the moment when the electromagnet of the single revolution clutch in question is energized and the moment when the pawl of this latter clutch is disengaged from the cut-out in which it was engaged. The energization of the additional clutch during this period of time is effected by means of a conventional hold-on or latch-in circuit which, since its structure is known, is not shown in the drawings for reasons of simplicity. The illustrated drive mechanism is not limiting on the processing apparatus shown in FIG. 1 and can be replaced by any equivalent device which could drive the endless belt 32 continuously or step by step in either direction.

The roller 38 on which the endless belt 36 is mounted may be connected mechanically to the shaft 120 of roller 33 by mechanical coupling means which, in the example being described, are formed, as shown in FIG. 3, by a pulley 121 which is attached to shaft 120. When shaft 120 is turning, pulley 121 drives a second pulley 123 attached to the drive shaft of a clutch EMB via a belt 122, clutch EMB being in turn mounted on the shaft of roller 38. This clutch is similar in construction to clutches W1 and W2. Given that the two pulleys 121 and 123 are identical and rollers 33 and 38 are of the same diameter, it will be appreciated that when shaft 120 is turning and clutch EMB is energized, the two belts 32 and 36 driven by these rollers move at the same speed and in the same direction.

If FIG. 2 is referred to again, it can be seen that the processing apparatus which is presently being described also includes detectors PHA and PHI which are arranged at the points where the supply station 17 and the recording device 21 are respectively situated, their purpose being to detect whether a check is present at the station or under the device. Similarly, two other detectors PHL and PHV, the function of which will be described below, are arranged at the points where the right-hand end, as seen in the drawing, of station 17 and the right-hand end, as seen in the drawing, of the intermediate stopped position 20 are respectively situated. In the example being described, each of the four detectors is formed by a photoelectric cell which normally receives a light beam emitted by a light source (not shown in the drawings) and which, on receiving this beam, generates an electrical voltage at its output. This voltage ceases whenever a check is inserted between the cell and the light source and interrupts the beam.

The reading device 19 which is shown in FIG. 2 is intended to read, one by one, characters printed along the lower edge of each check which are able to be identified by an automatic recognition device of a known kind. In the example being described, these characters, which are made up of vertical lines, have previously been printed on each check in a magnetizable ink. This being the case, the reading device 19 produces a series of signals whenever one of the characters passes in front of it. It should, however, be mentioned that these signals can only be generated by the device 19 if the ink forming the characters to be read has been magnetized before passage under the reading device 19. This magnetization is brought about by passing the characters under a magnetizing member 48 of a known kind, such as an electromagnetic member, which is arranged, as shown in FIG. 2, between the supply station 17 and the reading device 19. This being the case, it will be appreciated that when a check situated at the supply station is propelled by belt 36 towards the intermediate stopped position 20, the characters are first magnetized as they pass across member 48 and are then de-magnetized when they pass across the reading device 19. It should, however, be mentioned that reading device 19 which, in the example being described, analyses the coded characters printed on the check by a magnetic process, does not limit the invention and can be replaced by any other suitable reading device such as a reading device adapted to analyze characters by an optical process. In cases where such replacement occurs, the member 48 no longer serves any purpose and may be dispensed with.

There will now be described, with reference to FIGS. 4A to 4E when combined as indicated in FIG. 4, the logic layout of the circuits which are used to control, by means of the keyboard, the operation of the apparatus which has just been described. These circuits may either be circuits belonging to the apparatus itself, which circuits are then preferably accommodated in a cabinet arranged in the lower part of the desk 10, or they may form part of the internal circuitry of a central unit which can be connected to the apparatus.

In the logic diagrams the semi-circles containing a dot represent logic AND circuits and the semi-circles containing a plus sign represent logic OR circuits. The semi-circles containing no symbol or dot represent mixing circuits, and the triangles represent control circuits. Each control circuit has two inputs of which one, marked with a dot in the figures, is a grated input to which pulses to be transmitted are applied, and the other of which is a grating input to which an electrical voltage is applied. Any control circuit transmits a pulse applied to its grated input only if its grating input is at a positive potential. The circuits in question are conventional and similar to those which are described and illustrated in particular in British Pat. No. 1,038,558 or U.S. Pat. Nos. 3,293,677 and 3,276,767.

Also shown in FIGS. 4A to 4E are bi-stable components generally referred to as flip-flops. As is well known, flip flops, such as the flip-flop BDR, for example, which is shown in FIG. 4D, have a so-called "normal" input, a so-called "complementary" input, a "normal" output and a "complementary" output, and that it changes to or remains in the "1" state whenever it receives a pulse at its normal input and changes to or remains in the "0" state whenever it receives a pulse at its complementary input.

The keyboard 12 which is present on the top 11 of the apparatus is, as shown in FIG. 1, made up of two sections S1 and S2, which will be dealt with a little further on, and it includes four press-buttons DM, DA, DP and DF, and indicator lights which are generally referred to in FIG. 1 by reference V.

It will be assumed that, at the beginning, all the checks to be processed have been placed in the supply magazine 14 and there are no checks on the track of the apparatus. Given that, when this is the case, there is no check at the supply station 17, detector PHA emits from its output a positive voltage which, as shown in FIG. 4D, is applied to the input of an inverter 11, to one of the two inputs of an AND circuit E1, and to one of the two inputs of AND circuit E2. A check depletion indicator in the form of a lever switch KA of a known kind is so arranged in the supply magazine 14 as to be closed for as long as the supply magazine has not been fully emptied of the checks which have been placed in it. Because there are checks present in the magazine 14, switch KA is closed. Consequently, the second input of AND circuit E1, which is connected to the positive terminal (+) of a DC power source via the closed switch KA, is brought to a positive potential. Because both inputs of circuit E1 are at a positive potential, a positive voltage appears at its output and is applied to the gating inputs of two control circuits C1 and C2, which are thus made conductive.

It should also be mentioned that, at the beginning, all the flip-flops shown in FIGS. 4A to 4E are in the "0" state, except for flip-flop BIF which will be discussed later. This is true in particular of the flip-flop BMM (FIG. 4D), whose complementary output is thus brought to a positive potential. This being the case, a control circuit C3 whose gating input is connected to the complementary output of flip-flop BMM is made conductive. If the operator then presses push button DM which, as shown in FIG. 4D, is situated between a positive terminal (+) and a differentiating amplifier A1, a positive voltage is applied to the input of the differentiating amplifier A1. The latter is designed to emit from its output a single electrical pulse each time its input is brought to a positive voltage. This pulse, which is applied to the gated output of control circuit C1, is then transmitted by this circuit, which is conductive, and is applied on the one hand to the input of a delay member R1 of a known kind, and on the other hand to the gated input of control circuit C3. Because circuit C3 is conductive, the pulse is transmitted through it and is applied on the one hand, via a mixing circuit L1, to the extractor device 16 and the solenoid 45, and on the other hand to the input of a delay member R2 (FIG. 4B) and, via a mixing circuit L2, to a shift register RT which will be discussed below. The effect of the pulse transmitted by circuit L2 is to reset register RT to zero. The delayed pulse which then appears at the output of delay member R1 is applied to normal input of flip-flot BMM, which then goes to the "1" state. Because of this control circuit C3 is made non-conductive. Delay member R1 is arranged to delay the pulse which it receives in such a way that flip-flop BMM changes to "1" just after circuit C3 has transmitted the pulse which is applied to it. As a result, if the operator again pushes press-button DM and thus causes the differentiating amplifier A1 to emit a fresh pulse, this fresh pulse is blocked by circuit C3, which is now non-conductive.

The extraction device 16, in response to the pulses which it receives, causes a check to be extracted from the supply magazine 14 and this check then comes into position in the supply station 17, its insertion into the station being facilitated by the fact that the solenoid 45, which is energised as a result of the pulse which it receives, temporarily withdraws the two pressure rollers at the station from the belt 36.

Figure 4B:
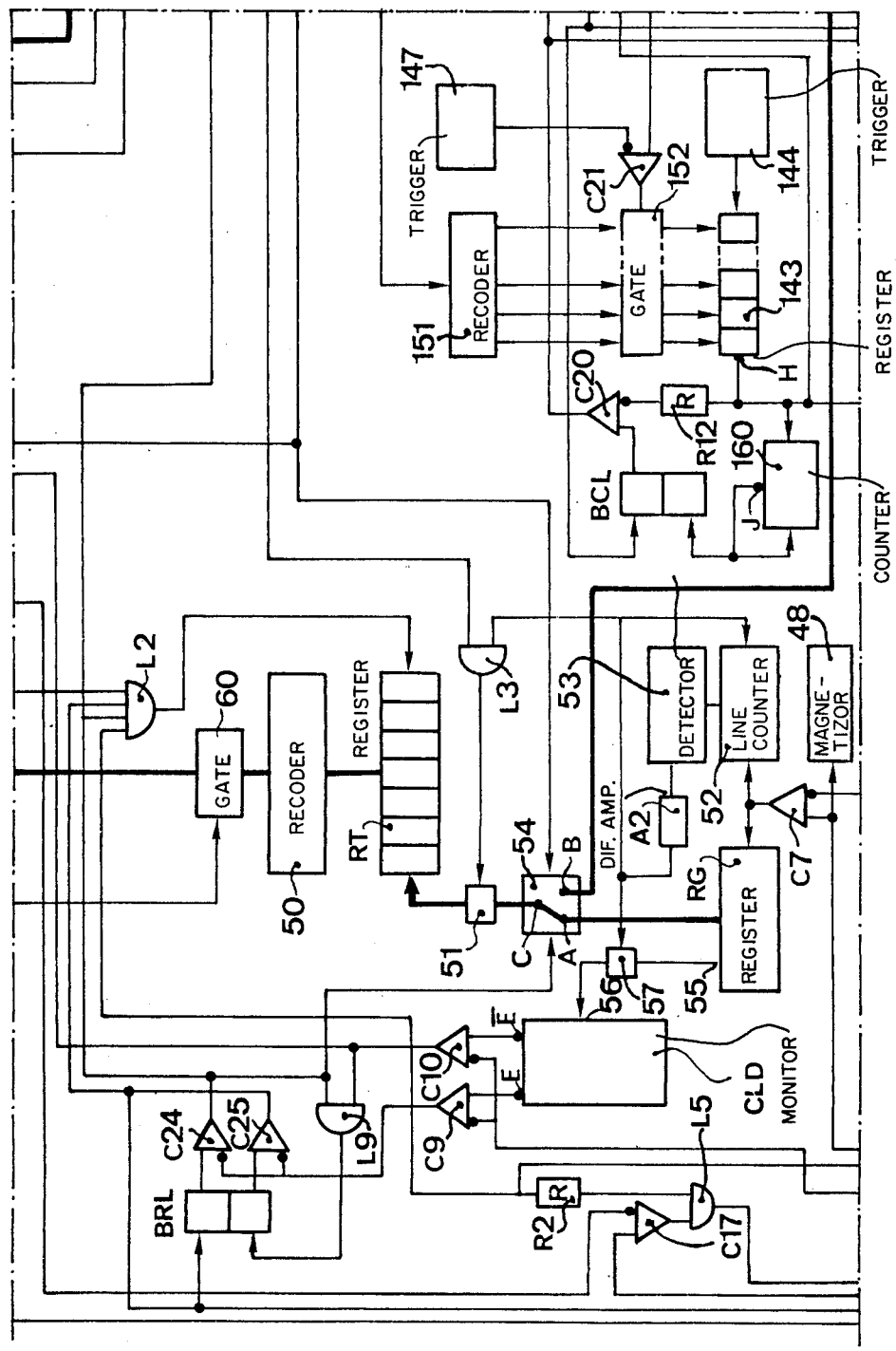

The shift register RT which is shown in FIG. 4B is intended to contain temporarily the data which is produced by the reading device 19 as it reads the coded characters printed along the lower longitudinal edge of each cheque. This register RT, which is of a known kind having a series input and parallel outputs, contains a number of storage location equal to the maximum number of coded characters printed on each of the cheques, each location being intended to contain temporarily the binary combination representing one character. Without going into any more detail on the make-up of the shift register RT, a description will now be given of what happens from the moment the register RT is re-set to zero by the pulse which, as indicated above, is transmitted by mixing circuit L2.

As soon as register RT has been re-set to zero, a delayed pulse appears at the output of delay member R2.

This delayed pulse is then transmitted successively, as can be seen in FIGS. 4B and 4D, by two mixing circuits L5 and L6 and is applied to the gated inputs of three control circuits C4, C5 and C6 (FIG. 4D). Of these three latter circuits only circuit C6 is conductive at the time. In effect, because there is now a check at the supply station 17, the output of detector PHA is no longer at a positive potential and consequently a positive voltage appears at the output of inverter circuit I1. A positive voltage thus appears at the output of a two-input OR circuit U1, one of whose inputs is connected to the output of inverter I1.

Because of this, no positive voltage appears at the output of an inverter I2 whose input is connected to the output of U1. This being the case, control circuit C4, whose gating input is connected to the output of inverter I2, is non-conductive. Similarly, because the output of detector PHA is not at a positive voltage, no positive voltage appears at the output of circuit E2 and consequently control circuit C5, whose gating input is connected to the output of E2, is non-conductive. Circuit C6 on the other hand, whose gating input is connected to the output of circuit U1, is conductive.

To sum up, the pulse which is transmitted by circuit L6 and applied to the three control circuits C4, C5 and C6 is only transmitted by circuit C6 and is applied to the normal output of a flip-flop BED which then goes to "1". The positive voltage which appears at the normal output of the flip-flop as a result of its going to the "1" state is applied on the one hand to two control circuits C7 and C8 (shown in FIGS. 4B and 4D, respectively), which thus becomes conductive, and on the other hand to the magnetizing member 48 (FIG. 4B) which was mentioned above. This positive voltage is also applied on the one hand, via an OR circuit U2 (FIG. 4D) to the clutch EMB, which is energized and connects roller 38 to shaft 120, and on the other hand to the electromagnetic clutch W1 which was mentioned above. Because clutches EMB and W1 are energized, roller 120 is driven by motor 35 and in turn drives the two belts 32 and 36 in a direction such that the check which has been positioned at station 17 is moved in the direction of hopper 26. The check thus passes in front of the magnetizing member 48, which magnetizes the coded characters which are printed along the lower longitudinal edge of the check, and then in front of the reading device 19 which, as the coded characters pass in front of it, produces a series of signals which are transmitted, via control circuit C7 which is conductive, to an analyzing arrangement of a known kind which, in the example being described, is similar to that described and illustrated in British Pat. No. 915,344 or U.S. Pat. No. 3,309,667. Without going into detail, it will merely be mentioned that this arrangement includes in particular, on the one hand a shift register RG, in which, whenever a coded character is read, the binary combination representing this character is recorded, and on the other hand a line counter 52 whose capacity corresponds to the number of lines making up each coded character, the contents of this counter being raised by one unit each time a line passes under the reading device 19. It should be mentioned that, in the example being described, each coded character is made up of seven lines which are separated from one another by long and short intervals arranged in accordance with a code representing the said character. The line counter 52 is connected to a device 53 of a known kind for detecting counter states, which is designed to produce a positive voltage each time the counter 52 counts the seven lines making up a character.

The positive voltage which thus appears each time a coded character has been read is applied to the input of a differentiating amplifier A2 which, being of the same kind as differentiating amplifier A1, thus emits a pulse from its output. Before describing the operations which are triggered by this pulse, it should be mentioned that the reading device 19 is designed to check each coded character which is read, using known means which are described for example in French Pat. No. 1,295,497, and, on the basis of this check to produce an error code consisting of two binary digits, this error code providing an indication of whether a character read is satisfactory or, on the other hand, whether it is erroneous, (i.e. of whether the number of lines detected is other than seven, or again of whether the number of long intervals detected is incorrect).

The shift register RG shown in FIG. 4B is of a known kind having a series input and parallel outputs and, in the example being described, contains eight storage positions, of which six are used to store temporarily the binary combination representing the characters read, and of which the other two are used to store temporarily the two binary digits of the associated error code. To enable the binary combination to be recorded in shift register RT, the outputs of the six positions are connected to the input of register RT via a change-over switch 54 and a gate 51.

As shown in FIG. 4B, the change-over switch 54 has a common output C connected to the input of register RT via gate 51, and two inputs A and B to either of which the switch 54 can be set. Input A is connected to the six outputs of register RG. Although six leads are required to enable the binary combination to be transferred to register RT, these six leads are represented by a single cable in FIG. 4B for obvious reasons of simplicity. Similarly, the outputs of the two positions which, in register RG, are used to record the binary digits of the associated error code, have been combined into a single position in FIG. 4B for the same reason, but it should be remembered that the two outputs referred to by reference 55 in this Figure are respectively connected, via a gate 57, to two corresponding inputs (referred to by a single reference 56 in the Figure) of a circuit CLD of a known kind for monitoring the reading of the check.

Read-checking circuit CLD has two outputs marked E and Ē respectively and that if, of all the error codes associated with the coded characters which have just been read, one at least is recognised by the checking circuit CLD as indicating that the associated character is erroneous, a positive voltage appears at output E of circuit CLD. If on the other hand none of the error codes represents an erroneous coded character, a positive voltage appears at output Ē of circuit CLD.

A description will now be given of what happens at the time when, the binary combination representing the first read character having been stored in shift register RG together with the error code associated with this character, a pulse appears at the output of differentiating amplifier A2. If FIG. 4B is referred to, it can be seen that the pulse is applied on the one hand to gate 57 to initiate the transfer to circuit CLD of the error code contained in register RG, and on the other hand to the line counter 52 to cause it to be set to zero. The pulse is also applied, via a mixing circuit L3, to gate 51, and, because the change-over switch 54 is initially set to its input A, this causes the binary combination contained in register RG to be recorded in the first location of shift register RT. In the example being described, in which register RT has seven recording locations as can be seen in FIG. 4B, the first location is that which, in the Figure, is situated at the left-hand end of the register. It should also be noted that, in the example being described, each of the locations in register RT contains six recording positions and, because of this, each location is able to contain the binary combination representing one character which has been read.

The other coded characters printed on the check which passes under the reading device 19 are read, and the corresponding binary combinations are recorded in register RT, in a similar way to that described above. Without repeating the whole of the explanation which has just been given, it will simply be mentioned that, whenever a binary combination corresponding to a read character arrives for recording in register RG, a pulse is emitted by differentiating amplifier A2 and, in particular, causes the error code associated with this combination to be transferred to circuit CLD and the binary combination to be recorded in the first location of shift register RT.

When the binary combination representing the second read character arrives for recording in the first location of register RT, the binary combination representing the first read character, which is recorded in the first location of register RT, is transferred to its second location. In general terms, each time a binary combination arrives for recording in the first location of register RT, each of the binary combinations previously recorded in the register undergoes a shift towards the right of the drawing and is thus recorded in the next location. These operations are repeated until all the binary combinations corresponding to the coded characters printed on the check which is being moved towards hopper 26 have been recorded in register RT. The binary combinations which are then present in register RT represent the account number of the customer who drew the check which has just been read. In the example being described, where each of the coded characters printed on the check consists of seven lines and where the six intervals which there are between the seven lines are divided into two long intervals and four short intervals, each of these binary combinations comprises, if the binary value "0" is allotted to any short interval and the binary value "1" to any long interval, two binary 1 digits and four binary 0 digits. Thus, in the example being described, the various coded characters which form the account number printed on the cheque are represented by the binary combinations given in the following table.

TABLE 1

| Coded Character printed | Corresponding binary combination |
|---|---|
| 0 | 001100 |
| 1 | 100010 |
| 2 | 011000 |
| 3 | 101000 |
| 4 | 100100 |
| 5 | 000110 |
| 6 | 001010 |
| 7 | 110000 |
| 8 | 010010 |
| 9 | 010100 |

A re-coding member of a known kind, indicated by reference 50 in FIG. 4B, is connected to the parallel outputs of shift register RT and enables each of the binary combinations contained in register RT to be converted into a corresponding binary coded decimal combination, the binary coded decimal combinations resulting from this re-coding then forming an item of data termed an address which, as will be seen below, will be used to select one of the recording locations in a memory 63 which will be discussed below.

The check which has just been read by the reading device 19 continues to be moved towards the hopper 26 until such time as the check, when it reaches the intermediate stop position 20, interrupts the light beam normally received by detector PHV. At this moment the output of detector PHV ceases to be at a positive potential. Because of this, a positive voltage appears at the output of an inverter I3 whose input is connected to the output of the detector PHV. The positive voltage which appears at the output of inverter 13 is applied to the input of a differentiating amplifier A3 which then emits an electrical pulse from its output. This pulse is applied to the gated input of control circuit C8, which is then conductive, and is transmitted by this circuit and applied, on the one hand, to the gated inputs of two control circuits C9 and C10 (FIG. 4B), whose gating inputs are connected to outputs E and $\bar{E}$ of checking circuit CLD, and on the other hand, via a mixing circuit L8, to the complementary input of flip-flop BED, which thus returns to the "0" state. As a result of this changeover, the normal output of the flip-flop ceases to be at a positive voltage and this, on the one hand, makes circuits C7 and C8 non-conductive and, on the other hand, de-energises the magnetizing member 48 and the two clutches EMB and W1. The effect of deenergising the two clutches is to stop the movement of the cheque and the cheque thus comes to a halt at the intermediate stopped position 20.

The operations which then take place differ according to whether none of the error codes which have been fed to circuit CLD are representative of an erroneous coded character, or whether on the other hand at least one of these error codes does represent an erroneous coded character. It will first be assumed that none of the error codes represents an erroneous coded character, that is to say that all the characters which have just been read have have been recognized as satisfactory. In this case, output $\bar{E}$ of circuit CLD is at a positive potential and consequently control circuit C10 is conductive. At output E of circuit CLD on the other hand, no positive voltage appears and because of this control circuit C9 is nonconductive. As a result, the pulse which, as was seen above, was emitted by differentiating amplifier A3 and transmitted by circuit C8 and applied to the gated inputs of circuits C9 and C10, is only transmitted by circuit C10, which applies it on the one hand, via a mixing circuit L9, to the complementary input of a flip-flop BRL which will be discussed below, and on the other hand, via a mixing circuit L10 (FIG. 4A), to the input of a delay member R3 and to a gate 60.

The pulse which is applied to gate 60 causes the account number which has been recoded by the recoding member 50 to be transferred on the one hand to an account-number verifying circuit CVN (FIG. 4A) and on the other hand to a selecting register 61 which will be discussed below. The verification circuit CVN is intended to check the account number of the customer whose check which has just been read in order to determine whether this account number is valid or whether on the other hand the number corresponds to a blocked account. In the example being described it will be assumed that the verification circuit CVN is composed of an associative memory of a known kind in which all the account numbers corresponding to blocked accounts have previously been recorded, and of a detecting member which detects whether or not the account number which has been transferred from the recoding member 50 to circuit CVN is identical with one of the account numbers which are recorded in the memory. The detecting member has two outputs which are marked P and $\bar{P}$ in FIG. 4A. In cases where the account number has been fed to circuit CVN and one of the numbers recorded in the memory belonging to this circuit are found to be identical, a positive voltage appears at the output marked $\bar{P}$ and this renders a control circuit C12, whose gating input is connected to this output, conductive. On the other hand, in cases where no such identity is found, a positive voltage appears at the output marked P and this renders a control circuit C11, whose gating input is connected to output P, conductive.

It will first be assumed that the account number which has been fed to CVN has not been found to be identical with any of the numbers recorded in the memory belonging to this circuit. In this case control circuit C11 is conductive whereas control circuit C12 is nonconductive. The delayed pulse which then appears at the output of member R3 is applied on the one hand, via L2, to shift register RT (FIG. 4B), which causes the register to be reset to zero, and on the other hand to the gated inputs of C11 and C12. The pulse is blocked by C12 but transmitted by C11 and is applied on the one hand to the input of a delay member R4 and on the other hand to selection controlling members 62 of a known kind which are connected to the outputs of the selecting register 61 and are associated with a data memory 63, this memory 63 containing data representing the balances of customers' accounts. It may usefully be mentioned at this point that the control members 62, which enable locations to be selected in memory 63 in order either to extract a customer balance contained in these locations or to record a new customer balance in the locations, are operated by control pulses which are applied to them by means of conductors DL and DE, while the selection of the locations takes place in a known manner as dicated by an address contained in selecting register 61. Memory 63 is associated with an input/output register RES which is intended to receive either a customer balance extracted from memory 63 or a new balance which is to recorded in memory 63. When a new balance contained in register RES is to be transferred to memory 63 to be recorded in it, the transfer takes place via a gate 64 which will be discussed below. Nothing further will be said about the structures of memory 63, register RES, the selection controlling members 62, the selecting register 61 and gate 64 for the reason that their structures are similar to those described and illustrated, in particular in FIGS. 2 and 3, of British Pat. No. 1,040,973 or U.S. Pat. No. 3,378,819.

It will merely be mentioned that, when a pulse is transmitted by control circuit C11 and applied to control members 62, via conductor DL, the balance which is recorded in memory 63 at the locations indicated by the address contained in selecting register 61 is extracted from the memory and transmitted to register RES, whereas, when a pulse transmitted by a mixing circuit L4, which will be described below, is applied via conductor DE to gate 64 and to the control members 62, the balance present in register RES is recorded in memory 63 at the locations indicated by the address contained in the selecting register 61. In the present case, the effect of the pulse which, as seen above, was transmitted by circuit C11 and applied to the selection controlling circuit 62, is to extract from the memory 63 a balance for the customer whose account number appears on that cheque, which, having been read, is now in the intermediate stopped position 20.

This balance, having been extracted from memory 63, is recorded in register RES. At this moment a delayed pulse appears at the output of delay member R4 and is applied on the one hand to the normal input of a flip-flop BAF (FIG. 4E), which then goes to the "1" state, and on the other hand, via a mixing circuit L15, to the gated inputs of control circuit C2 and control circuit C13 (FIG. 4D). Because of the fact that there is at present no check in the supply station 17 but the supply magazine 14 is not empty, the output of circuit E1 is a positive voltage. This being the case, circuit C2 is conductive and transmits the pulse which is applied to it to the extractor device 16 and the solenoid 45, thus causing a second cheque to be presented to the supply station 17. Because there is no check under the recording device 21, the output of detector PHI is at a positive potential and there is therefore no positive voltage at the output of an inverter I4 which is connected by its input to the output of this detector. As a result, circuit C13, which has its gating input connected to the output of inverter I4, is non-conductive and therefore blocks the pulse which is applied to it.

Since flip-flop BAF is now at "1", a positive voltage appears at its normal output. This positive voltage is applied to the gating input of a control circuit C14, which thus becomes conductive, to an indicator light V1 which is then lit, and to section S2 of keyboard 12. The effect of indicator V1 being lit is to advise the operator that, since S2 is now live, he is able to use section S2 of the keyboard to transcribe the hand-written details from the cheque which is now stationary at the intermediate stopped position 20. It will be recalled that in the present case these markings represent the amount of a debit by the customer. However, it should be mentioned that, in cases where the documents being processed are formed by money orders, these markings would represent the amount of a credit. The amount of this debit or credit is then punched out by the operator on section S2 of the keyboard, after a character indicating the nature of the amount has first been punched out, this character specifying that the amount is to be subtracted from the customer's balance in the case of a debit or is to be added to his balance in the case of a credit. Each time a character is punched out on section S2 of the keyboard, a binary combination is generated by this section and is transmitted, via a cable F, to a shift register RD (FIG. 4A). When all the hand-written characters carried by the cheque which is immobile at position 20 have been transcribed in this way, the amount which is then recorded in coded form in shift register RD is compared with the balance contained in register RES. For this purpose, a comparator 66 of a known kind is provided, this comparator being connected to the outputs of registers RES and RD. The comparators 66, which has two outputs marked S and I, is adapted to bring its output S to a positive voltage when the amount of the debit or credit which is recorded in register RD is more than the balance recorded in register RES and to bring its output I to a positive voltage when the amount is less than or equal to this balance. In addition, a detector member 67 is connected to the outputs of register RD to detect whether, among the data recorded in the latter, there is a character which specifies that the amount is to be subtracted from the balance. This member 67, which has two outputs D and $\bar{D}$, is adapted to bring its output D to a positive potential when such a character is detected, that is to say, when a debit operation is to be performed, and to bring its output $\bar{D}$ to a positive potential when there is no such character in register RD, that is to say, when a credit operation is to be performed.

FIG. 4A shows that one of the two inputs of an AND circuit E3 is connected to output S of comparator 66, while the other input of this circuit is connected to output D of detector 67. Similarly, one of two inputs of an AND circuit E4 is connected to output I of comparator 66, while the other input of this circuit is connected to output D of detector 67. The output of circuit E3 is connected to the gating input of a control circuit C15. Also, one of the two inputs of an OR circuit U3 is connected to the output of E4 while the other input of this circuit is connected to output $\bar{D}$ of detector 67. Finally, the output of U3 is connected to the gating input of a control circuit C16. Without going into detail, it will merely be mentioned that, in cases where a debit operation is to be performed and the amount of the debit, which is recorded in register RD, is more than the balance which is recorded in register RES, circuit C15 is conductive and circuit C16 is non-conductive, whereas in other cases circuit C16 is conductive and circuit C15 is non-conductive.

Consideration will first be given to what happens when the operation which is to be performed is a credit operation, or again when the operation which is to be performed is a debit operation but the amount of this debit is less than, or at most equal to, the customer's balance. In this case circuit C16 is conductive. As a result, when the operator, having punched out on section S2 of the keyboard all the characters for the amount written on the check which is stationary at the stopped position 20, presses a push-button DF (FIG. 4E) to apply a positive voltage to the input of a differentiating amplifier A4, a pulse is generated by A4. This pulse is transmitted by circuit C14, which is conductive, and is applied on the one hand to the complementary input of flip-flop BAF, which then returns to "0", this having the effect of rendering C14 non-conductive, extinguishing indicator V1, and switching off S2, and on the other hand to the gated inputs of circuits C15 and C16 (FIG. 4A). The pulse is blocked by C15 but transmitted by C16 and is applied on the one hand to the input of a delay member R5 and on the other hand to two gates 68 and 69. Under the prompting of this pulse, gate 68 causes the balance which is recorded in register RES to be transferred to an adder/subtractor AS, while gate 69 at the same time causes the amount, and the character indicating whether this amount is a credit or debit, which were recorded in register RD, to be transferred to the adder/subtractor. The adder/subtractor then adds together (in the case of a credit) or subtracts from one another (in the case of a debit) the two items of data (balance and amount) which have thus been fed to it and as a result of this operation it produces a new balance. The delayed pulse which then appears at the output of R5 is applied on the one hand to a gate 70, thus causing this new balance to be transferred to register RES, and on the other hand to the input of a delay member R6. The delay applied by R6 is such that a pulse appears at its output when the transfer has been completed and is applied, via circuit L4, on the one hand to the input of a delay member R7 and on the other hand to gate 64 and control members 62, thus causing the new balance to be recorded in those locations of memory 63 which are designated by the address contained in selecting register 61. The delayed pulse which then appears at the output of R7 is applied to the one hand, via a mixing circuit L7, to registers 61, RES and RD, which causes these three registers to be reset to zero, and on the other hand to the gated input of a control circuit C17 (FIG. 4B). Circuit C17, whose gating input is connected to the complementary output of a flip-flop BDR (FIG. 4D) which will be discussed below, is conductive because the said flip-flop is in the "0" state. Circuit C17 thus transmits the pulse which it receives and applies it, via mixing circuits L5 and L6 (FIG. 4D) to the gated inputs of circuits C4, C5 and C6.

Because, as explained above, there is now a second check at the supply station 17, the output of inverter I1 is at a positive potential. The output of U1 is thus at a positive potential and consequently circuit C6 is conductive. Also, given that there is not a positive voltage at the output of detector PHA, the output of E2 is not at a positive potential and consequently circuit C5 is non-conductive. Finally, because the output of U1 is at positive potential, no positive voltage appears at the output I2 and because of this circuit C4 is non-conductive. As a result, the pulse which is applied to the three circuits C4, C5 and C6 is only transmitted by circuit C6, which applies it to the normal input of flip-flop BED. This flip-flop then goes to "1" and this on the one hand renders circuits C7 and C8 conductive and on the other hand energises clutches W1 and EMB. This being the case, as explained above, the two belts 32 and 36 are driven simultaneously in a direction such that the first and second check, which up to that point were stationary at position 20 and the supply station 17 respectively, are now moved in the direction of hopper 26. In the course of this movement the second check passes across the reading device 19 and the coded characters which it carries are thus read in the same way as was explained in detail above. At the moment when the second check interrupts the light beam which is normally directed onto detector PHV, differentiating amplifier A3 generates a pulse, which is transmitted by C8 and applied on the one hand to the complementary input of BED, which thus returns to "0" and halts the movement of the two belts 32 and 36, and on the other hand to the gated inputs of C9 and C10, thus triggering the same operations as were described above, assuming that none of the coded characters on the second cheque have been recognised as erroneous. Without going into detail, it will be merely mentioned that, in the course of these operations, the account number which has been read from the second check is verified and, if it is recognised as valid, the pulse which is emitted by delay member R3 is transmitted by circuit C11, which initiates the transfer to register RES of the amount which was recorded in memory 63 at the address indicated by the account number concerned. The same pulse, after being delayed by R4, in particular causes flip-flop BAF to changeover to "1", thus switching on S2 and enabling the operator to punch out the amount of the debit which is written on the second check, which check is in turn immobilised at position 20.

The recording device 21 and the detector PHI are so arranged that, when the two belts 32 and 36 are driven to bring the second check from the supply station 17 to the stopped position 20, the first check which, in the course of this movement, was simultaneously moved from position 20 towards the hopper 26, is already partly engaged under device 21 at the moment when the second check, as it arrives at the stopped position 20, causes the two belts 32 and 36 to come to a halt. Because the first check, which is now stationary under device 21, intercepts the light beam which is directed onto detector PHI, there is not a positive voltage at the output of this detector. Consequently, the output of inverter I4 is at a positive potential and this renders circuit C13 conductive. As a result, the pulse which is emitted by R4 and which is applied on the one hand to the normal input of BAF and on the other hand to circuits C2 and C13, is transmitted by circuit C13 and is applied by it, via a mixing circuit L11, to the normal input of a flip-flop BPM, which then goes to "1". In addition, in cases where the magazine is not empty, circuit C2 transmits the pulse which it receives to the extractor device 16 and to the solenoid 45, which thus causes a third cheque to be extracted from the magazine and to be inserted in the supply station 17. Because flip-flop BPM goes to "1", a positive voltage appears at its normal output, and is applied on the one hand to the gating input of a circuit C18, which thus becomes conductive, and on the other hand to the input of a pulse generator G1 which, when energised, emits pulses for as long as its input is held at a positive potential. The pulses which are successively emitted by generator G1 are applied to clutch W4, each pulse thus causing the first check to be moved one step in the direction of supply station 17.

It should be noted that, during this step by step movement by the first check, clutch EMB is not energised and as a result the second check and the third check, which are situated at the stopped position 20 and the supply station 17 respectively, remain stationary. As soon as, by reason of its step by step movement, the first check ceases to interrupt the light beam which is directed towards detector PHI, a positive voltage appears at the output of detector PHI and is applied to the input of I4 and to the input of a differentiating amplifier A5. The pulse which is then produced by A5 is applied to the gated input of circuit C18 which, being conductive, transmits it on the one hand to the complementary input of flip-flop BPM, which returns to "0", and on the other hand to the input of a delay member R8. Because flip-flop BPM is now at "0", circuit C18 becomes non-conductive, and generator G1 ceases to emit pulses. The delayed pulse which then appears at the output of R8 is applied on the one hand to the input of a delay member R9 and on the other hand, via a mixing circuit L12, to clutch W3, which causes the first check to advance one step towards hopper 26 while the second and third cheques remain stationary. The delayed pulse which then appears at the output of R9 is applied, via L12, to clutch W3 and thus causes the first check to advance a further step in the direction of hopper 26, the check thus being brought to what is termed the recording position where, as will be explained below, it is able to receive the first character to be recorded on it. The delayed pulse which appears at the output of R9 is also applied to the normal input of a flip-flop BCL (FIG. 4B), which thus goes to "1" and renders a control circuit C20 conductive, to the input of a selecting switch CSM (FIG. 4C), which moves in steps and is associated with a memory 140 in which are stored the characters which are to be recorded on each cheque, and finally, via a mixing circuit L13, to the input of a delay member R10.

Figure 4C:
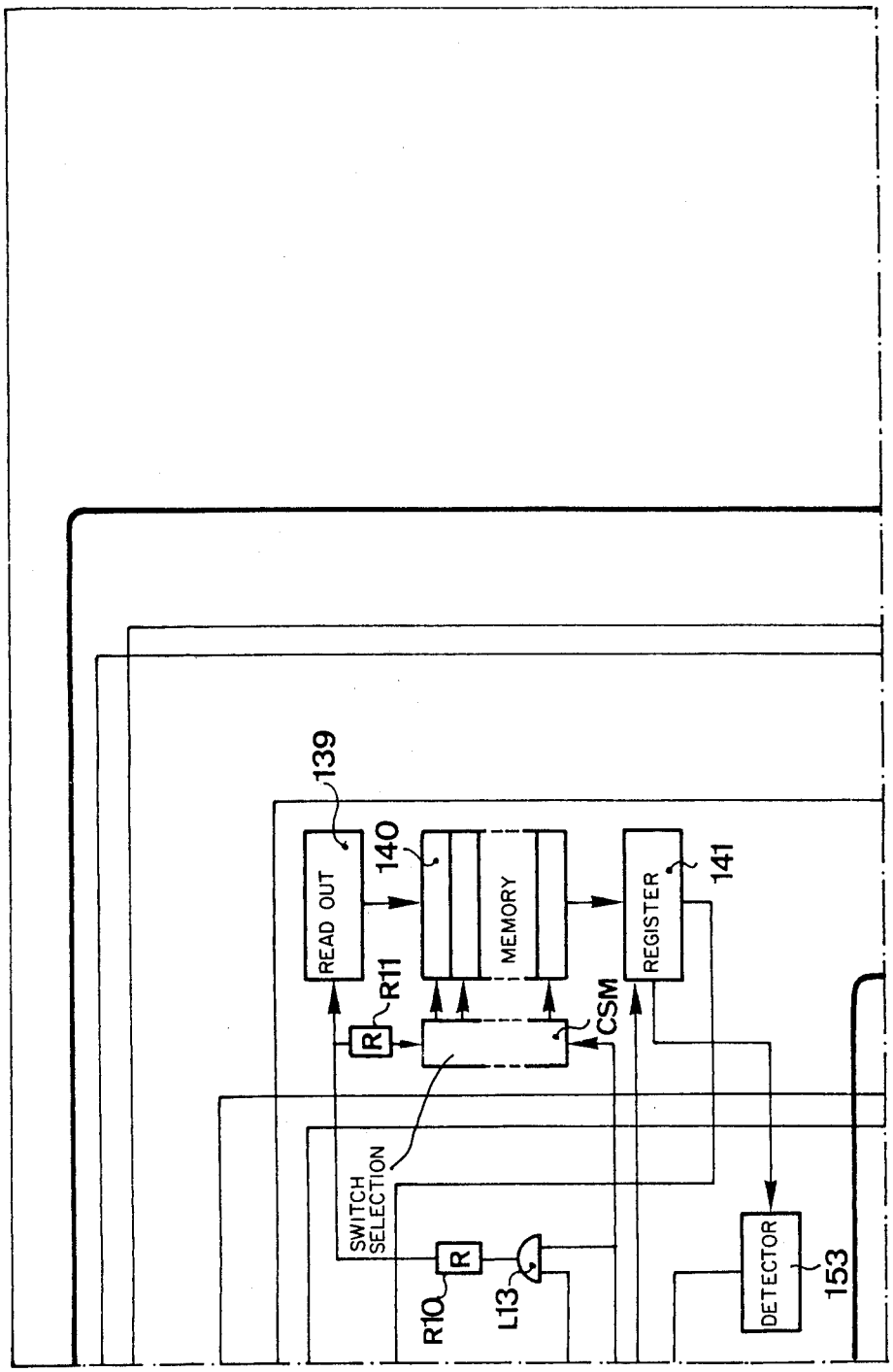
Figure 4D:
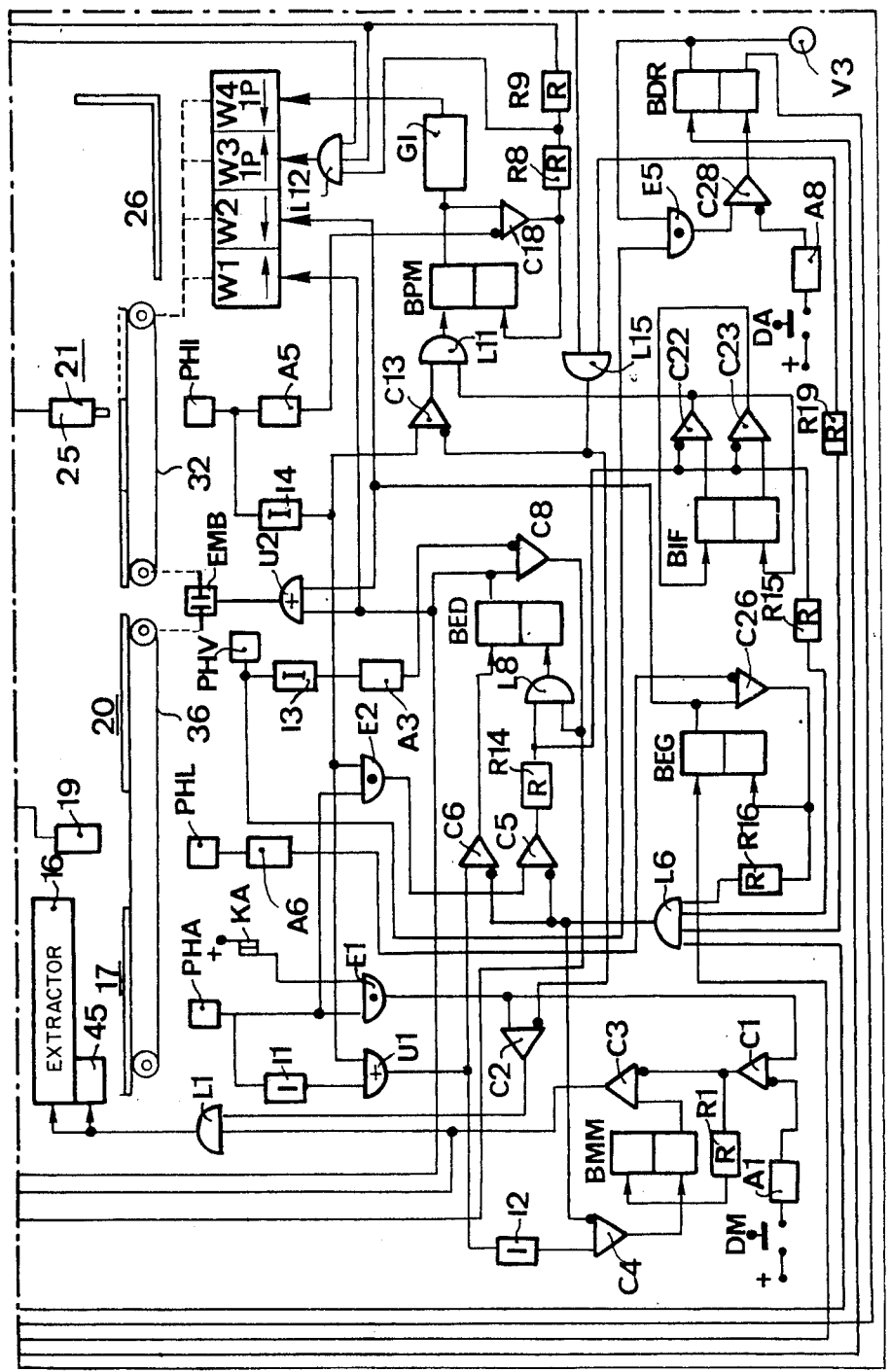
Figure 4E:
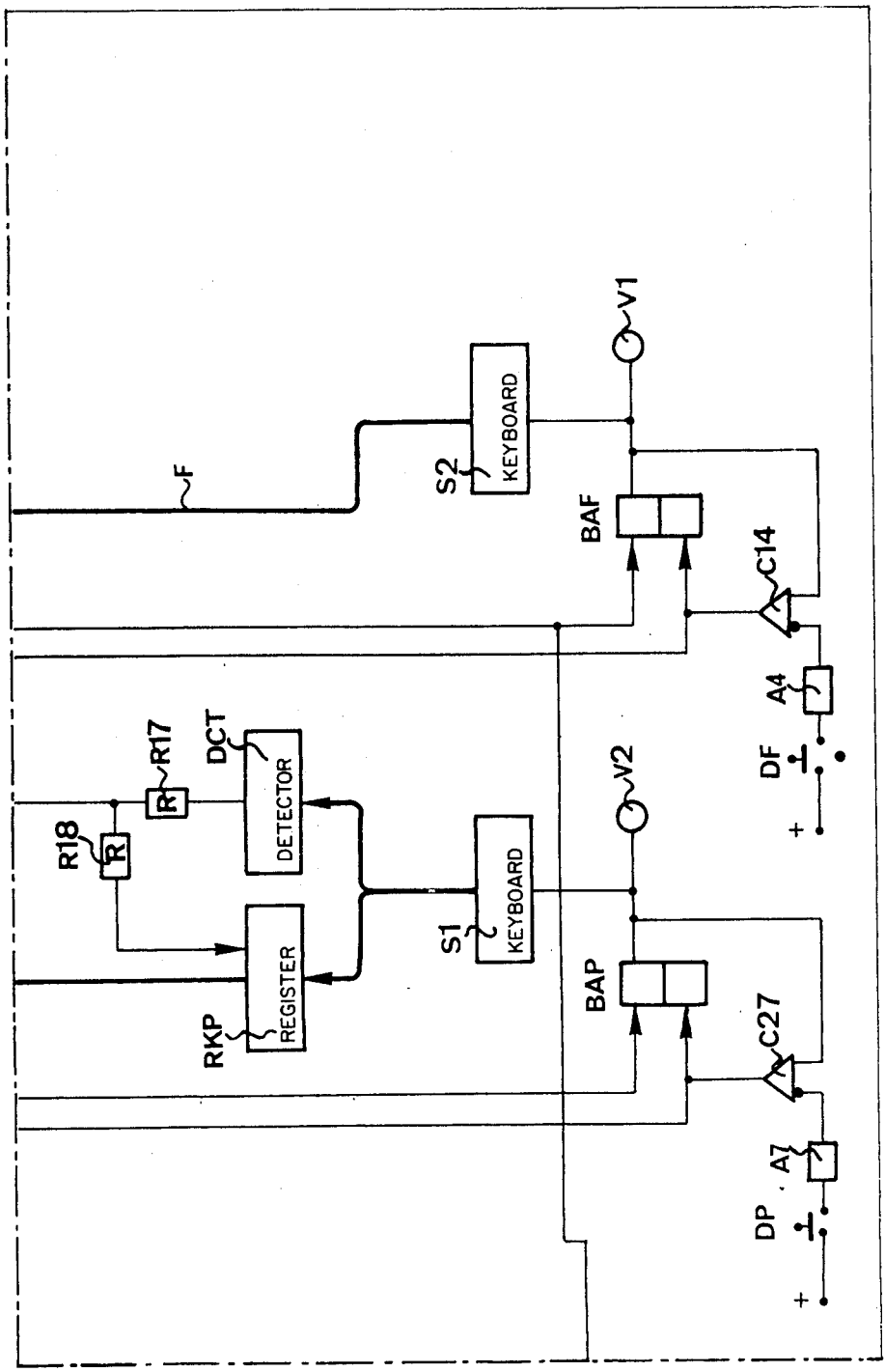

The memory 140 shown in FIG. 4C is a matrix memory which contains a plurality of locations, each location holding a single character. These locations are successively selected by the selecting switch CSM, which moves one step each time it receives a pulse from a delay member R11 which will be discussed below. The character stored in the memory location selected by switch CSM is extracted, by means of read-out circuits 139, in response to a pulse which is transmitted by delay member R10 to these circuits 139, this character being transferred to an output register 141 after having been extracted from its location. Nothing further will be said about the structures of memory 140, circuits 139 and the selecting switch CSM, since their structures are similar to those which are described in detail and illustrated in British Pat. No. 1,034,212 or U.S. Pat. No. 3,349,376. It will merely be mentioned that the pulse which, as seen above, is emitted by delay member R9 and applied to switch CSM, has the effect of setting the switch to the first location of memory 140.

The delayed pulse which then appears at the output of delay member R10 in response to the pulse which was transmitted by R9 to member R10, is applied on the one hand to the input of delay member R11 and on the other hand to readout circuits 139, which causes the character which up to that point was recorded in the first location of memory 140 to be extracted from the memory. This character extracted from memory 140, which is represented by a binary combination, is then recorded in register 141. After having been recoded by a recoder 151 (FIG. 4B) connected to the output of register 141 the binary combination is used to load a shift register 143 which forms part of strike-triggering circuits of a known kind, which circuits cause the striking hammer 24 to be actuated at a moment such that the first cheque is applied, for a very brief interval, against the printing wheel 22, at the time when the printing character corresponding to the binary combination contained in register 141 is opposite the cheque.

For details of the operation of these circuits, reference may be made to French Pat. No. 2,284,931. Although not all that is said in that patent will be repeated, it will however be noted that register 141 is associated with a detecting member 153 (FIG. 4C), which is adapted to bring its output to a positive potential, and thus render a control circuit C21 (FIG. 4B) conductive, during the whole of the time that register 141 contains a binary combination representing a character which has been extracted from memory 140. A triggering circuit 147, which is actuated in a known manner by a timing disc (not shown) mounted on the shaft of wheel 22, generates a pulse at each revolution of the disc, this pulse being applied to the gated input of C21 and, when this circuit is conductive, being transmitted to a control gate 142, which then causes the re-coded item of data supplied by re-coder 151 to be transferred to shift register 143. The timing disc also actuates a second triggering circuit 144 each time a printing character on the wheel 22 arrives at the level of the line to be printed on the cheque, which each time causes the item of data which is recorded in register 143 to be shifted one position.

Register 143 contains as many recording positions as there are printing characters on the wheel 22, that each position is only able to record a single binary digit "0" or "1" and that the item of data which is recorded in register 143 is formed by a binary combination containing only a single "1" digit, the other digits being "0's". Thus, each time a pulse is transmitted by circuit 144 to register 143, the "1" digit is shifted one position and, as a result of the successive shifts, is finally fed out of the register; its feed-out being marked by a pulse which appears at output H of the register and is applied to the input of a delay member R12, to the input of a pulse counter 160, to the actuating device 25 and to output register 141, the effect on the latter being to reset it to zero.

In response to the pulse which it receives, the actuating device 25 actuates the strike hammer 24, which then applies the first check against the wheel 22 for a brief moment, thus causing a first character to be printed on the check. While these printing operations are taking place, a delayed pulse has appeared at the output of R11 and, having been applied to the selecting switch CSM, has caused the switch to move on one step, thus setting it to the second location of memory 140. The delayed pulse which then appears at the output of R12 is applied to the gated input of circuit C20. If circuit C20 is conductive, it transmits the pulse which it receives and applies it on the one hand, via L13, to the input of R10 and on the other hand, via L12, to clutch W3, the effect of which is to move the first check one step up in the direction of hopper 26, the first check then being in position to receive the second printed character. The operations which then take place are similar to those which have just been described. Without going into detail, it will briefly be stated that each time a delayed pulse is emitted by R10, a character is extracted from memory 140 and converted by recoder 151 into an item of data which is transmitted to register 143, while switch CSM also moves up one step. As indicated in the above mentioned French Pat. No. 2,284,931, the loading of register 143 is not initiated by circuit 147 until such time as the blank portion of wheel 22, that is to say the portion of the wheel on which there are no printing characters, is passing in front of the strike hammer 24.

In the course of the next revolution performed by the wheel, a single pulse is transmitted by register 143 to device 25 and a single character is thus printed on the check, while the number which is recorded in counter 160 is increased by one unit. This counter is adapted to generate a pulse from its output J when the number which it contains reaches a predetermined value which is at most equal to the number of locations in memory 140, that is to say is at most equal to the number of characters which can be recorded in this memory. In the example being described, it will be assumed that this predetermined value has been set at five and that, because of this, a pulse is emitted by counter 160 when five characters have been printed on the first cheque. This pulse is applied on the one hand to counter 160, which is thus reset to zero, and on the other hand to the complementary input of flip-flop BCL which since it then returns to "0", renders circuit C20 non-conductive and because of this, stops the delayed pulse which is subsequently emitted by R10. From this moment no further characters are printed on the first cheque.

While the characters were being printed on the first check, the operator has been using section S2 of the keyboard to transcribe the handwritten characters on the second cheque which is stationary at the stopped position 20. This transcription however takes more time than is needed to print the characters on the first check and the printing operation will thus already be completed when the operator, having completed the transcription, presses push-button DF. In cases where the amount of the debit entered on the second check is less than the balance in the drawer's account, or again in cases where the amount is for a credit, the operations which then take place are similar to those described above. Without repeating all that has been said on this point, it will merely be mentioned that, in the course of these operations, the new balance which results from the debit or credit is recorded in memory 63 and clutches EMB and W1 are then energised, thus causing the three checks to be propelled along by belts 32 and 36. In the course of this movement, the first check is ejected into the receiving hopper 26, the second check is brought under the recording device 21 and the third check is advanced to the stopped position 20, the coded characters printed on the third check being read by the reading device 19 in the course of this movement. If, in the course of this reading operation, none of the coded characters is recognised as erroneous, and if the account number formed by these characters then proves to be valid, an operating phase then takes place in which a fourth check is extracted from the magazine 14 and inserted in the supply station 17, whilst at the same time characters are printed on the second check and, in addition, the operator uses section S2 of the keyboard to transcribe the handwritten characters carried by the third cheque.

These operations are repeated until, with the last check to be processed in the stopped position 20 and the new balance which results from the processing of this check recorded in memory 63, the delayed pulse which is emitted by R7 and transmitted by C17, L5 and L6 is applied to the gated inputs of C4, C5 and C6. Given that there is then no check at the supply station 17 but the penultimate check is under the recording device 21, the two inputs of E2, which are respectively connected to the output of PHA and the output of I4, are both at a positive voltage and consequently the output of E2 is now at a positive voltage, which renders C5 conductive. The pulse which is then applied to circuits C4, C5 and C6 is transmitted by C5 and C6. This pulse, when transmitted by C5, is applied to the input of a delay member R14, whilst when transmitted by C6 it is applied to the normal input of flip-flop BED and causes clutches EMB and W1 to be energised and the last two cheques to be moved along by the belts 32 and 36.

In the course of this movement the penultimate check is ejected into the hopper 26 and the last check is similarly advanced towards the hopper. However, the delay member R14 is such that the delayed pulse which then appears at its output, and which is applied via L8 to the complementary input of flip-flop BED, causes this flip-flop to return to "0" at the moment when the last cheque, as it is moved along by belts 32 and 36, arrives under the recording device 21. The pulse which is emitted by R14 is also applied on the one hand to the input of a delay member R15 and on the other hand to the gated inputs of two control circuits C22 and C23, whose gating inputs are connected to the normal output and the complementary output respectively of a flip-flop BIF. Because this flip-flop is initially in the "1" state, circuit C22 is conductive and circuit C23 is non-conductive. The pulse which is applied to both these circuits is thus transmitted only by circuit C22, which applies it on the one hand to the complementary input of flip-flop BIF, which thus goes to the "0" state, and on the other hand, via L11, to the normal input of flip-flop BPM, which thus goes to "1" and triggers the printing of characters on the last check. Delay member R15 is such that a delayed pulse does not appear at its output until the printing operation has been completed. This delayed pulse is applied, via L6, to circuits C4, C5 and C6. Because the last check is interrupting the light beam which is directed towards PHI, the output of U1 is at a positive potential and consequently C4 is non-conductive and C6 is conductive. Also, because there is no check at station 17 the output of E2 is at a positive potential and C5 is thus conductive. The pulse which is applied to circuits C4, C5 and C6 is thus transmitted by C5 and C6. When transmitted by C5 it is applied to the input of R14 whereas, when transmitted by C6, it is applied to the normal input of BED, which causes clutches EMB and W1 to be energised and consequently the last check to be propelled along and ejected into hopper 26. The delayed pulse which then appears at the output of R14 is applied, via L8, to the complementary input of BED, which thus returns to "0" and causes belts 32 and 36 to stop. The same pulse is also applied to the input of R15 and to the gated inputs of C22 and C23. Because BIF is now at "0", this pulse is transmitted by C23 which applies it to the normal input of BIF. Flip-flop BIF thus returns to "1". The delayed pulse which then appears at the output of R15 is applied, via L6, to circuits C4, C5 and C6. Because none of the light beams which are directed towards detectors PHA, PHL, PHV and PHI are now interrupted, there is no positive voltage at the outputs of U1 and E2 and consequently circuit C4 is conductive while C5 and C6 are non-conductive. The pulse which is applied to C4, C5 and C6 is thus transmitted only by C4, which applies it to the complementary input of BMM, which thus returns to "0". From this moment, the operator may place fresh check to be processed in the supply magazine 14, the processing of these check taking place, when the operator then actuates push-button DM, in a similar way to that described above.

A description will now be given of what happens when, following the reading of the coded characters carried by a check which has just arrived at the stopped position 20, at least one of these characters has been found to be erroneous or illegible. In this event, output E of checking circuit CLD (FIG. 4B) is brought to a positive potential, which renders circuit C9 conductive. The pulse which is emitted by A3 when the cheque arrives at position 20 and which, when transmitted by C8, is applied in particular to the inputs of C9 and C10, is thus transmitted by C9, which applies it to the gated inputs of two control circuits C24 and C25 (FIG. 4B), the gating inputs of these circuits C24 and C25 being connected to the normal output and the complementary output respectively of flip-flop BRL. Because this flip-flop is at "0", circuit C25 is conductive whilst C24 is non-conductive. The pulse which is applied to these two circuits is thus transmitted by C25, which applies in on the one hand to the normal input of BRL, which goes to "1", and the normal input of a flip-flop BEG (FIG. 4D), which also goes to "1", and on the other hand, via L2, to shift register RT, which is thus reset to zero.

Because BEG (FIG. 4D) is now at "1", a positive voltage appears at its normal output and is applied to the gating input of a circuit C26, which thus becomes conductive. This voltage is also applied to clutches EMB and W2 which, being energised in this way, cause the belts 32 and 36 to be driven in a direction such that the cheque which has been brought to the stopped position 20 is, like that which has been brought under the recording device 21 (assuming one has), moved in that direction of the supply station 17. When the first-mentioned check, having been passed under the reading device, again ceases to obstruct the light beam which is directed towards detector PHL, a pulse is emitted by a differentiating amplifier A6 which is connected by its input to the output of this detector. This pulse, which is applied to the gated input of C26, is transmitted by circuit C26 and applied on the one hand to the input of a delay member R16 and on the other hand to the complementary input of BEG, thus causing clutches EMB and W2 to be energised and as a consequence belts 32 and 36 to come to a halt. They come to a halt at the moment when the check which has been moved from the stopped position 20 arrives at station 17. Under these circumstances, the output of U1 is at a positive voltage and that of U2 is not. The result is that C6 is conductive and C4 and C5 non-conductive. The delayed pulse which then appears at the output of R16, and which is applied via L6 to circuits C4, C5 and C6, is only transmitted by circuit C6 and is applied to the normal input of BED. Clutches EMB and W1 are thus energised and this causes the check which has been brought to station 17 to be moved towards hopper 26. The check is then re-read and is stopped at the moment when it again reaches the stopped position 20. If, following this repeat reading, none of the coded characters carried by the check have been found to be erroneous or illegible, output E of circuit CLD is brought to a positive potential and circuit C10 is rendered conductive. This being the case, the pulse which is emitted by A3 and transmitted by C8 and applied to circuits C9 and C10, is transmitted by C10 and thus triggers the same operations as were described in detail above. It may be mentioned that, in the course of these operations, flip-flop BRL is reset to "0" by the pulse which is transmitted by C10 and L9 and applied to its complementary input. If on the other hand, after the repeat reading of the check which is now located at position 20, at least one coded character has been found to be erroneous or illegible, it is the output $\bar{E}$ of circuit CLD which is brought to a positive potential. This being the case, the pulse which is emitted by A3 and transmitted by C8 and applied to circuits C9 and C10, is transmitted by C9, which in turn applies it to C24 and C25.

Because flip-flop BRL was set to "1" when the previous reading operation was checked, and because circuit C24 is conductive as a consequence, this pulse is transmitted by C24 and is applied on the one hand to the change-overswitch 54, which is thus set to its input B, this input being connected to the outputs of a register RKP (FIG. 4E) which will be discussed below, and on the other hand, via L9, to the complementary input of flip-flop BRL, which then goes to "0". The pulse which is transmitted by C24 is also applied on the one hand, via L2, to register RT, which is thus re-set to zero, and on the other hand to the normal input of a flip-flop BAP (FIG. 4E), which then goes to "1". This changeover causes a positive voltage to appear at the normal output of BAP, and this positive voltage is applied to the gating input of a control circuit C27 which thus becomes conductive, to an indicator light V2 which thus lights up, and to section S1 of keyboard 12 which is thus switched on. The operator, having been warned by the illumination of indicator V2, is then able to use section S1 of the keyboard to transcribe the coded characters which are printed on the check which is stationary at the stopped position 20.

Each time a character is punched out by the operator on section S1 of the keyboard, the coded combination representing this character is emitted by section S1 and is fed on the one hand to register RKP, where it is recorded, and on the other hand to a detecting and control member DCT of a known kind which is adapted to generate a pulse each time it receives a coded combination from S1. This pulse, which is applied to the input of a delay member R17, only appears at the output of this member when the operation of recording the coded combination in register RKP has been completed. The delayed pulse which is emitted by R17 is applied on the one hand to the input of a delay member R18 and on the other hand, via L3, to gate 51, which, because switch 54 is now set to its input B, causes the coded combination which had previously been recorded in register RKP to be recorded in the first location of register RT. When this recording operation has been completed, a delayed pulse appears at the output of R18 and is applied to register RKP, thus causing this register to be re-set to zero. This zero-reset takes place before the next coded combination arrives for recording in register RKP. The recording in shift register RT of the coded combinations which are successively produced by the operator as he punches them out on section S1 of the keyboard takes place in a fashion similar to that just described and nothing more will therefore be said about this operation.

When the operator has transcribed in this way all the coded characters printed on the check which is stationary at position 20, the operator presses a push-button DP (4E) to apply a positive voltage to the input of a differentiating amplifier A7. The amplifier responds by transmitting a pulse to the gated input circuit of circuit C27 which, being conductive, transmits it and applies it on the one hand to the complementary input of flip-flop BAP, which thus returns to "0", and on the other hand to the changeover switch 54, which is thus reset to its input A, and finally, via L10, to the input of R3 and to gate 60. The effect of the pulse which is applied to gate 60 is to transfer the account number which results from the recoding by re-coder 50 of the binary combinations contained in register RT on the one hand to the verification circuit CVN and on the other hand to the selecting register 61. From this moment, the operations which take place are similar to those which were described above, these operations being initiated by the delayed pulse which appears at the output of member R3.

A description will now be given of what happens in cases where the account number which has been fed to circuit CVN (FIG. 4A) and one of the account numbers which are recorded in the memory of this circuit are found to be identical. In this case, circuit C12 is conductive whereas circuit C11 is non-conductive. The delayed pulse which is emitted by R3 and applied to these two circuits is thus transmitted by C12, which applies it, via a mixing circuit L14 (FIG. 4A), to the normal input of flip-flop BDR (FIG. 4D), which then goes to "1". The positive voltage which appears as a result at the normal output of this flip-flop is applied on the one hand to an indicator light V3, which thus lights up, and on the other hand to one of the two inputs of an AND circuit E5, the other input of this AND circuit being connected to the output of detector PHV. The pulse which is transmitted by C12 is also applied, via mixing circuit L7, to registers 61, RES and RD, which causes these three registers to be reset to zero. The effect of the illumination of indicator V3 is to warn the operator that the check which is then stationary at position 20 is not acceptable and should be removed from the track. As soon as it has been removed, a positive voltage appears at the output of detector PHV and the output of E5 is thus brought to a positive potential, which renders conductive a control circuit C28 which is connected by its gating input to the output of E5. The operator can then press a pushbutton DA to apply a positive voltage to the input of a differentiating amplifier A8, which then emits a pulse. This pulse is applied to the gated input of circuit C28 and is transmitted by this circuit, which applies it on the one hand to the input of a delay member R19 and the complementary input of flip-flop BDR, which thus returns to "0", and on the other hand, via L15, to both of circuits C2 and C13. If the magazine 14 is not empty, circuit C2 transmits the pulse which it receives, and this causes a fresh check to be inserted at station 17. Also, if there is a check under the recording device 21, circuit C13 transmits the pulse which it receives and this initiates the printing of characters on the check. It is only after the maximum period likely to be required for this printing operation has elapsed that a delayed pulse appears at the output of R19. This pulse, which is transmitted by L6, is applied to the three circuits C4, C5, C6. The operations which are initiated at this moment are similar to those described above and for this reason nothing further will be said about them.

A description will finally be given of what happens in cases where the amount which has been punched out by the operator on section S2 of the keyboard is a debit and moreover is higher than the balance which has been extracted from memory 63 and is recorded in register RFS. In this case, as explained in detail above, circuit C15 is conductive whilst circuit C16 is non-conductive. As a result, the pulse which is emitted by A4 (FIG. 4E) and transmitted by C14 and applied to these two circuits is only transmitted by circuit C15. It is then applied on the one hand, via L14 (FIG. 4A) to the normal input of flip-flop BDR (FIG. 4D), which thus goes to "1", and on the other hand, via L4 (FIG. 4A), to the input of R7, to gate 64 and to the selection controlling circuits 62, the effect of which is to re-record in memory 63 the balance in register RES. The delayed pulse which then appears at the output of R7 is applied on the one hand, via L7, to registers RD, RES and 61, which causes these three registers to be reset to zero, and on the other hand to the gated input of C17 (FIG. 4B). Given that flip-flop BDR is not at "1", circuit C17 is nonconductive and thus blocks the pulse which it receives. In addition, the illuminated indicator V3 warns the operator that no debit has been performed for the check from which he has just transcribed the amount onto the keyboard, since the balance was inadequate to allow this operation. The operator must therefore remove this check from the track before pressing push-button DA. Pressing the button after the cheque has been removed triggers the operations described a little earlier and the details of these will not be repeated.

FIG. 5 is a diagram which reproduces the detailed logic diagram shown in FIGS. 4A to 4E in a simplified form, the principal logic circuits from the detailed diagram having been combined in the diagram of FIG. 5 to form functional blocks which allow the operation of the document handling apparatus to be controlled. In FIG. 5, the drive to the conveyor mechanism to cause the documents to move continuously towards the receiving hopper 26 is provided by means of first advance controlling means CA1, which means consist, in the example being described, of the clutch W1 discussed above. FIG. 5 also shows second advance controlling means CA2 and third advance controlling means CA3 which are used to control the step by step movements of a document respectively towards the supply station 17 and towards the hopper 26. In the example being described, these means CA2 and CA3 respectively consist of the clutches W3 and W4 discussed above.

The second conveyor 31 is mechanically connected to the first conveyor 30 by mechanical coupling means, i.e. clutch EMB. The energisation of the means CA1 and the means EMB is controlled by a power-supply means or control unit 200, this unit consisting of flip-flop BED and circuit C8 from the detailed diagram. This unit 200 feeds an electrical voltage to the means CA1 and EMB in response to an energisation signal which is transmitted to it by a triggering means 201, this member being formed, in the example being described, by push-button DM, differentiating amplifier A1, circuits C1 and C3, delay member R2 and circuits L5, L6 and C6. The arrival of a document at the intermediate stopped position 20 is detected by the first detector PHV, which then feeds a control signal to the control unit 200, the effect of this signal being to de-energise means CA1 and EMB. The signal which is transmitted by circuit C8 forms a signal for the end of the first phase, this signal being fed to a verification means 202. This verification means 202 consists of the read-checking circuit CLD, the verification circuit CVN and circuits C9 and C12 from the detailed diagram. Circuits CLD and CVN receive the coded signals which are generated by the reading device 19. If the coded signals satisfy pre-determined conditions for validity (namely that the characters read are not erroneous and that the account number read and none of the account numbers recorded in CVN is identical) verification unit 202 transmits, in response to the signal which it receives for the end of the first phase, a validity signal on the one hand to a positioning controlling means or unit 203 and on the other hand to transcription means 204. In the example being described these transcription means consist of flip-flop BAF and section S2 of the keyboard. The positioning controlling unit 203 consists of flip-flop BPM and circuit C18. When unit 203 receives a validity signal emitted by unit 202, it activates the pulse generator G1, which then feeds pulses to the third advance controlling CA3. Because of this, the document which has been brought under the recording device 21 is fed step by step in the direction of supply station 17. When the document is on the point of moving clear of device 21, a second detector PHI transmits a control signal to unit 203, the effect of which is to de-activate generator G1 and thus to stop the movement of the document. In response to the control signal emitted by the second detector PHI, unit 203 emits a signal for the end of positioning to a unit 205 for initiating recording and advance. Unit 205 consists, in addition to flip-flop BCL, counter 160 and circuit C20 from the detailed diagram, of all the components from the detailed diagram which enable the recording device 21 to be controlled; in particular components 139, 140, 141, 142 and 151, (all these components being combined into a single block marked 170), shift register 143 and triggering circuit 144. Without repeating in detail all that was said above, it will merely be stated that, when a pulse representing a signal to initiate recording is transmitted from register 143 to device 21, this device 21 causes a character to be recorded on the document situated beneath it. This same pulse, after being delayed, is transmitted by circuit 20 to the second advance controlling means CA2 to cause the document to be moved one step in the direction of hopper 26 once the character has been recorded, so that the document will be correctly positioned to receive the next character.

From the overall explanation given above it will be seen that, in the apparatus which forms the subject of the invention, the processing of check takes place in essence in two recurrent operating phases. In the course of the first of these phases the information which is present on a given check and which can be identified by an automatic recognition device is read by this device, while in the course of the second phase the information which is present on the check and which can be identified only by the human eye is read by the operator and transcribed by means of the keyboard. In addition, during this second phase, fresh data is recorded on another check, this check being that which, in the course of the preceding pair of operating phases, was subjected to a reading operation. To be more specific, the operations of reading and recording data are performed by causing the check to advance one after another, in the course of the first phase, until a check reaches a stopped position after having passed under the automatic recognition automatic device; the check which was formerly in the stopped position being brought, in the course of this movement, under the data recording device and the check which was formerly under the data-recording device being ejected, in the course of this same movement, into the receiving hopper and, in the course of the second phase, by causing data to be recorded on the check which has been brought under the recording device, while the information which is only identifiable by the human eye and is carried by the cheque which has been brought to the stopped position is read visually and transcribed. It will thus be appreciated that, because the operations which are performed on the check are carried out simultaneously, the overall time taken to process a check is virtually reduced to the time required to allow the operator to transcribe on to the keyboard that information on the cheque which can only be identified by the human eye. In effect, the overall processing time consists, in addition to the time required for transcription, of the time taken to transfer the check from the supply station 17 to the intermediate stopped position; this time is generally very short, i.e. of the order of half a second. As a result, with the apparatus which forms the subject of the invention, the rate at which check or similar documents are processed is considerably increased.

The invention is not of course in any way limited to the embodiments which have been described and illustrated and these have only been given as illustrations. The invention does in fact embrace all means which form technical equivalents of those described and illustrated, whether considered separately or in combination and when employed in the scope of the following claims.

I claim:

1. A method of processing documents which carries information of a first kind identifiable only by the human eye and information of a second kind identifiable by an automatic recognition device, in which method each document is subjected to two recurrent operating phases including an operation involving the reading and transcribing of the information which it carries and an operation involving the recording of fresh data on the document, the method comprising advancing the documents one after another past a first reading station reading the information of the second kind recorded on a given document by an automatic recognition device at said first reading station, advancing the documents to a second reading station, visually reading at said second reading station the information of the first kind carried by the document and transcribing said information of said first kind by means of an encoding device, advancing said documents to a recording station and recording fresh data on a document which was subjected to a reading operation in the course of the two preceding operating phases while simultaneously reading information of the first and second kind on other documents at said first and second stations.

2. A method of processing documents according to claim 1, wherein in the course of a first operating phase, the documents are advanced one after another in such a way that one of the said documents passes under an automatic recognition device, while the document which previously passed under the recognition device in the course of the previous first operating phase is brought under a data recording device, and in that, in the of the second phase, data is recorded on the document which has been brought under the said recording device while, simultaneously, the information of the first kind present on the document under the said recognition device in the course of the first phase which precedes the said second phase, is read visually and transcribed.

3. Apparatus for processing documents which are introduced one by one into a supply station, and advanced towards a receiving station via, successively, a reading station, an intermediate station where the documents are in a stopped position and a data-recording station, comprising recording means at said data recording station for recording fresh data on a document past said recording means, a first conveyor which extends past the said recording means between the said intermediate station and the receiving station; first means for controlling advancement of documents and being coupled to said first conveyor and adapted to be energized to cause a document to feed continuously forward by the conveyor towards the receiving station; second means for controlling advancement of documents and being coupled to said first conveyor and adapted to be energized to cause a document which has been advanced to the recording station to be moved intermittently under the recording means; a second conveyor which extends between the supply station and the intermediate station; mechanical coupling means arranged between the first conveyor and the second conveyor and adapted to be energized to mechanically couple the second conveyor to the first conveyor; and switching means for energizing, in the course of a first phase, only the said first means for controlling advance and the said coupling means such that a document situated under the recording means is ejected towards the receiving station while a second document located in the intermediate station is brought under the recording means and a third document is advanced from the supply station to the intermediate station, and, in the course of a second phase, only the said second means for controlling advancement of documents, to enable the document which has been brought under the recording device to be advanced intermittently under this device and to receive fresh data.

4. Apparatus according to claim 3, including reading means at said reading station for reading data on the documents and wherein said switching means comprises detector means positioned at the intermediate station for generating a control signal at the moment when a document which has passed under the reading means arrives at the intermediate station, manually operable triggering means for producing an energization signal, and a power-supply control means connected to the coupling means, to the first means for controlling advance, to the said detector, and to the said triggering member, said power supply control means adapted to receive the energization signal and the control signal and being arranged on the one hand to supply an energization voltage to the said coupling means and the first means for controlling advance, between the time when it receives an energization signal emitted by the triggering member and the time when it receives a control signal emitted subsequently by the detector, and on the other hand to supply a signal marking the end of the first phase at the moment when it ceases to supply the said energization voltage.

5. Apparatus according to claim 4 wherein the reading means is arranged to generate coded signals as a result of reading information of the second kind carried by a document which passes under it, said switching means including verification means connected on the one hand to the reading means for receiving coded signals emitted by said reading means and on the other hand to the power-supply control means for receiving the signal corresponding to the end of the first phase which is emitted by said control means, said verification means being arranged to verify whether the coded signals meet pre-determined validity conditions and, if these conditions are satisfied, to emit a validity signal, in response to the reception of the signal corresponding to the end of the first phase.

6. Apparatus according to claim 5 further including third means for controlling advancement of documents, said third means being coupled to the first conveyor so that, in response to a received pulse, a document which has been brought under the recording means by the first conveyor in the course of the first phase is caused to be moved one step in the direction of the supply station, and in that the switching means also includes pulse generator means connected to receive said validity signal and also connected to the said third means for controlling advance to transmit pulses thereto from the moment of activation, positioning controlling means connected to the said pulse generator means and to the verification means, and a second detector positioned at the point where the recording means is situated to emit a control signal at the moment when the document which has been advanced under said second detector is on the point of moving clear of the detector as it is moved towards the supply station, said control means being connected to the second detector and being arranged to activate the said pulse generator between the moment when it receives a validity signal emitted by the verification means and the moment when it receives a control signal emitted by the second detector.

7. Apparatus according to claim 6 wherein said positioning controlling means is arranged to generate a signal marking the end of positioning in response to the reception of the control signal, the switching means also including means for initiating recording and advance, said initiating means being connected to the data-recording means, to the second means for controlling advance and to the positioning controlling unit, the said initiating means being arranged to transmit, in response to receiving a signal marking the end of positioning, on the one hand a signal to initiate recording to the said recording means in order to initiate the recording of fresh data on the document which has been positioned under the recording means, and on the other hand a pulse to the said second means for controlling advance each time a character has been recorded on the said document, to enable this document to be advanced one step in the direction of the reception station.

8. Apparatus according to claim 7 wherein the data recording means is arranged to trigger the recording of a character on the document situated beneath it each time it receives a signal to initiate recording, the means for initiating recording and advance including counting means arranged to count the number of signals for initiating recording which are transmitted by the initiating means and to stop the signals from being transmitted when the number of signals which have been transmitted to the recording device becomes equal to a predetermined limiting number.

9. Apparatus according to claim 5 further including transcription means to enable the information of the first kind carried by the document to be transcribed, said transcription means being connected to the verification means and being arranged to be validated only between the moment when a validity signal emitted by the verification unit is received and the moment when the next energization signal is transmitted to the power supply controlling means.

10. Apparatus according to claim 6 further including transcription means to enable the information of the first kind carried by the document to be transcribed, said transcription means being connected to the verification means and being arranged to be validated only between the moment when a validity signal emitted by the verification unit is received and the moment when the next energization signal is transmitted to the power supply controlling means.

11. Apparatus according to claim 7 further including transcription means to enable the information of the first kind carried by the document to be transcribed, said transcription means being connected to the verification means and being arranged to be validated only between the moment when a validity signal emitted by the veritication unit is received and the moment when the next energization signal is transmitted to the power supply controlling means.

12. Apparatus according to claim 8 further including transcription means to enable the information of the first kind carried by the document to be transcribed, said transcription means being connected to the verification means and being arranged to be validated only between the moment when a validity signal emitted by the verification unit is received and the moment when the next energization signal is transmitted to the power-supply controlling means.

* * * * *

UNITED STATES PATENT AND TRADEMARK OFFICE
CERTIFICATE OF CORRECTION

PATENT NO. : 4,175,694

DATED : November 27, 1979

INVENTOR(S) : Claude Jules Donabin

It is certified that error appears in the above-identified patent and that said Letters Patent are hereby corrected as shown below:

Column 28, claim 2, line 9, before "of the" insert --course--.

Signed and Sealed this

Twelfth Day of February 1980

[SEAL]

Attest:

Attesting Officer

SIDNEY A. DIAMOND

Commissioner of Patents and Trademarks